United States Patent
Abrams et al.

(10) Patent No.: US 7,895,219 B2
(45) Date of Patent: Feb. 22, 2011

(54) SYSTEM AND METHOD FOR GUIDED AND ASSISTED STRUCTURING OF UNSTRUCTURED INFORMATION

(75) Inventors: Steve Abrams, New City, NY (US); Bard Bloom, Yorktown Heights, NY (US); Matthew Kaplan, New York, NY (US); Paul Turquand Keyser, New York, NY (US); Douglas Neil Kimelman, Cortlandt Manor, NY (US); Eric Marshall Nelson, Durham, NC (US); Wendy D. Neuberger, Vestal, NY (US); Tova Roth, Woodmere, NY (US); Ian Simmonds, Dobbs Ferry, NY (US); Steven Shu Hsiang Tang, Tarrytown, NY (US); John Matthew Vissides, Mohegan Lake, NY (US); Clay E. Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/134,500

(22) Filed: May 23, 2005

(65) Prior Publication Data
US 2006/0265415 A1 Nov. 23, 2006

(51) Int. Cl.
*G06F 7/00* (2006.01)
*G06F 17/30* (2006.01)
*G06F 17/00* (2006.01)

(52) U.S. Cl. ...................... 707/756; 707/602

(58) Field of Classification Search ................. 707/756, 707/602, 999.101
See application file for complete search history.

(56) References Cited

U.S. PATENT DOCUMENTS

| 6,078,924 | A  | * | 6/2000  | Ainsbury et al. ............ 707/101 |
| 6,675,159 | B1 | * | 1/2004  | Lin et al. ........................ 707/3 |
| 6,728,707 | B1 | * | 4/2004  | Wakefield et al. .............. 707/5 |
| 6,910,182 | B2 | * | 6/2005  | Huang ......................... 715/239 |
| 7,043,531 | B1 | * | 5/2006  | Seibel et al. ................ 709/206 |
| 2004/0268236 | A1 | * | 12/2004 | Chidlovskii et al. ......... 715/513 |
| 2006/0242180 | A1 | * | 10/2006 | Graf et al. ................... 707/101 |

OTHER PUBLICATIONS

Youngs, et al., "A Standard for Architecture Description", IBM Systems Journal 38(1), 1999, pp. 32-50.
Alexander Wolfe, "Eclipse: A Platform Becomes an Open-Source Woodstack", ACM Queue 1(8) Nov. 2003, pp. 14-16.
Wall, et al., "Programming Perl", (3rd Edition) O'Reilly, Jul. 2000, pp. 35-41.

* cited by examiner

*Primary Examiner*—Khanh B Pham
*Assistant Examiner*—Van H Oberly
(74) *Attorney, Agent, or Firm*—Vazken Alexanian; McGinn IP law Group, PLLC

(57) ABSTRACT

A method (and system) for generating a structured representation from an unstructured description includes receiving, by a computer, an unstructured description, and generating, by the computer, a structured representation based upon the unstructured description.

19 Claims, 24 Drawing Sheets

| Artifacts | Description | Formalizations |
|---|---|---|
| | Big Huge Record company (*BHR Records*) wants a web-based Music Web System.<br><br>Goals:<br><br>• Allow artists to post news/information about tours, as well as downloadable songs -- teasers from albums, individually sold songs, or songs that they choose to release. *Important:* Artists must have creative control over their sites, subject to the business constraints imposed by BHR.<br><br>• Record execs and mgmt can get access to traffic data and stats to track trends in the fan base, see who is getting more hits / downloads, etc. Can also track revenue/financial info<br><br>• Fans get rich interaction with their favorite bands. They can create a portal including their favorite bands, artists, songs, etc. Effectively, they are setting up their own virtual record label. They will be able to order physical CDs as well as download songs. They will need to log in for access to customization features, but may access other features anonymously. | Actor<br>Use Case<br>Scenario<br>Collaboration<br>Component<br>Interface<br>Location<br>Node<br>Connection<br>DU<br>NFR |
| Recommendations | | |

FIG. 17

| Artifacts | Description | Formalizations |
|---|---|---|
| | Big Huge Record company *(BHR Records)* wants a web-based Music Web System.<br><br>Goals:<br><br>• Allow artists to post news/information about tours, as well as downloadable songs -- teasers from albums, individually sold songs, or songs that they choose to release. *Important:* Artists must have creative control over their sites, subject to the business constraints imposed by BHR.<br><br>• Record execs and mgmt can get access to traffic data and stats to track trends in the fan base, see who is getting more hits / downloads, etc. Can also track revenue/financial info<br><br>• Fans get rich interaction with their favorite bands. They can create a portal including their favorite bands, artists, songs, etc. Effectively, they are setting up their own virtual record label. They will be able to order physical CDs as well as download songs. They will need to log in for access to customization features, but may access other features anonymously. | Actor<br>Use Case<br>Scenario<br>Collaboration<br>Component<br>Interface<br>Location<br>Node<br>Connection<br>DU<br>NFR |
| Recommendations | | |

FIG. 19

| Artifacts | Description | Formalizations |
|---|---|---|
| artists | Big Huge Record company (*BHR Records*) wants a web-based Music Web System.<br><br>Goals:<br><br>• Allow [artists] to post news/information about tours, as well as downloadable songs -- teasers from albums, individually sold songs, or songs that they choose to release. *Important:* Artists must have creative control over their sites, subject to the business constraints imposed by BHR.<br><br>• Record execs and mgmt can get access to traffic data and stats to track trends in the fan base, see who is getting more hits / downloads, etc. Can also track revenue/financial info<br><br>• Fans get rich interaction with their favorite bands. They can create a portal including their favorite bands, artists, songs, etc. Effectively, they are setting up their own virtual record label. They will be able to order physical CDs as well as download songs. They will need to log in for access to customization features, but may access other features anonymously. | Actor<br>Use Case<br>Scenario<br>Collaboration<br>Component<br>Interface<br>Location<br>Node<br>Connection<br>DU<br>NFR |
| Recommendations | | |

FIG. 20

| Artifacts | Description | Formalizations |
|---|---|---|
| artists | Big Huge Record company (*BHR Records*) wants a web-based Music Web System.<br><br>Goals:<br><br>• Allow artists to post news, information about tours, as well as downloadable songs -- teasers from albums, individually sold songs, or songs that they choose to release. *Important:* Artists must have creative control over their sites, subject to the business constraints imposed by BHR.<br><br>• Record execs and mgmt can get access to traffic data and stats to track trends in the fan base, see who is getting more hits / downloads, etc. Can also track revenue/financial info<br><br>• Fans get rich interaction with their favorite bands. They can create a portal including their favorite bands, artists, songs, etc. Effectively, they are setting up their own virtual record label. They will be able to order physical CDs as well as download songs. They will need to log in for access to customization features, but may access other features anonymously. | Actor<br>Use Case<br>Scenario<br>Collaboration<br>Component<br>Interface<br>Location<br>Node<br>Connection<br>DU<br>NFR |
| Recommendations | | |

FIG. 21

| Artifacts | Description | Formalizations |
|---|---|---|
| artists<br>post news | Big Huge Record company (BHR Records) wants a web-based Music Web System.<br><br>Goals:<br><br>• Allow artists to post news information about tours, as well as downloadable songs -- teasers from albums, individually sold songs, or songs that they choose to release. *Important:* Artists must have creative control over their sites, subject to the business constraints imposed by BHR.<br><br>• Record execs and mgmt can get access to traffic data and stats to track trends in the fan base, see who is getting more hits / downloads, etc. Can also track revenue/financial info<br><br>• Fans get rich interaction with their favorite bands. They can create a portal including their favorite bands, artists, songs, etc. Effectively, they are setting up their own virtual record label. They will be able to order physical CDs as well as download songs. They will need to log in for access to customization features, but may access other features anonymously. | Actor<br>Use Case<br>Scenario<br>Collaboration<br>Component<br>Interface<br>Location<br>Node<br>Connection<br>DU<br>NFR |
| Recommendations | | |
| Use Case 'post news' -- Prepend an identifier to its label e.g. 'UC01_post news'. | | |

FIG. 22

| Artifacts | Description | Formalizations |
|---|---|---|
| artists<br>post news<br>Fans<br>UC01_Create portal | Big Huge Record company *(BHR Records)* wants a web-based Music Web System.<br><br>Goals:<br><br>• Allow artists to post news information about tours, as well as downloadable songs -- teasers from albums, individually sold songs, or songs that they choose to release. *Important:* Artists must have creative control over their sites, subject to the business constraints imposed by BHR.<br><br>• Record execs and mgmt can get access to traffic data and stats to track trends in the fan base, see who is getting more hits / downloads, etc. Can also track revenue/financial info<br><br>• Fans get rich interaction with their favorite bands. They can create a portal including their favorite bands, artists, songs, etc. Effectively, they are setting up their own virtual record label. They will be able to order physical CDs as well as download songs. They will need to log in for access to customization features, but may access other features anonymously. | Actor<br>Use Case<br>Scenario<br>Collaboration<br>Component<br>Interface<br>Location<br>Node<br>Connection<br>DU<br>NFR |

Recommendations

Use Case 'post news' -- Prepend an identifier to its label e.g. 'UC02_post news'.
Use Case 'UC01_Create portal' -- Create at least one Scenario for this Use Case e.g. 'UC01a_Create portal successfully'.

FIG. 24

SYSTEM AND METHOD FOR GUIDED AND ASSISTED STRUCTURING OF UNSTRUCTURED INFORMATION

BACKGROUND OF THE INVENTION

1. Field of the Invention

The present invention generally relates to methods and systems for structuring and formalizing unstructured and imprecise information. In particular, it relates to methods and systems for taking unstructured information and making it both structured and formal, with support from a computer system that provides guidance. Additionally, the present invention relates to a system for taking an imprecise description of a procedure or task and making it precise and formal with the assistance of a computer.

2. Description of the Related Art

A great, many activities—particularly creative activities—including engineering, require a practitioner to produce structured diagrams, documents or specifications of a solution to a customer's needs. For example, a civil engineer may produce blueprints and structural analyses when designing a new bridge, an information technology (IT) architect produces requirements documents, and design models when designing an IT system to meet a new business need, or a composer produces a score for a film. In each of these domains the result of the creative work is a highly structured specification or design sufficient to be constructed or acted upon by others.

At the same time, there are systems dedicated to these domains which represent information in the formal or structured concepts of the domain. As an example, a typical tool for IT architecture can represent IT constructs such as components, interfaces, and the like, while a typical tool for scoring a film represents the parts of the score, the notes played by the instruments, and temporal aspects of the film.

In contrast, at the onset of these activities, the available information is typically unstructured and varied in quality, quantity and detail reflecting the origins of the information from a variety of sources. Much input comes from interviews and meetings during which the practitioner may capture notes. Other input is prepared by people who do not share the practitioner's training or who for other reasons supply materials using an unstructured format, rather than using a tool in the creative domain. For example, an IT customer may specify requirements or business goals in a text document.

As a result of this mismatch between the content and format of the information available to the practitioner at the onset, and that required by the tools and artifacts of the trade, the systems dedicated to these domains often have limited appeal. In both the musical and IT architectural domains, for example, research shows that practitioners do not use domain-specific tools until after they have worked out many details of the solution. The result is often inefficiencies and inaccuracies.

Moreover, although most data in the world is in a format that is unstructured and informal (this includes documents containing information that is in the English language and other languages), computers require that information be in a format that is structured and formal before they can perform sophisticated processing activities upon that information, such as executing a sequence of steps using the information, detecting inconsistencies in the information, or the like. Formal representations of information have a precise syntax and semantics that may be mathematically defined. This is what allows information that is in a formal format to be processed by a machine. For example, creating formal representations with precise semantics is necessary for several information processing activities, such as, for example, querying databases, creating formal models of systems, reasoning over collections of data, and the like.

Unfortunately, the creation of formal representations can be a bottleneck to applying these and related processing activities because the experts who possess detailed knowledge concerning the domain of an application are often unskilled at producing formal representations.

There are two conventional approaches that attempt to address this bottleneck. However, both of these conventional approaches are severely limited. Conventionally, when an unskilled person wishes to create a structured, formalized representation of information, they can either: (1) find an expert in formalized notations to help them, or (2) try to learn the notation themselves. The first approach is severely limited because, as explained above, experts in formalized notations who are familiar with the domain are rare and the second approach is limited because of the difficulty of learning the complexities of any particular formal notation.

There are existing techniques that attempt to address processing and management of unstructured information. These conventional approaches are known as Unstructured Information Management (UIM) approaches. However, these approaches are typically concerned with issues like document categorization, clustering, and retrieval, as opposed to reasoning and machine-based execution of the information.

There is a need for a method and system that can automatically create elements in a formal representation using informal information such that the information becomes suitable for machine processing.

SUMMARY OF THE INVENTION

In view of the foregoing and other exemplary problems, drawbacks, and disadvantages of the conventional methods and structures, an exemplary feature of the present invention is to provide a method and system in which a structured representation is generated from an unstructured representation.

In a first exemplary aspect of the present invention, a method for generating a structured representation from an unstructured description includes receiving, by a computer, an unstructured description, generating, by the computer, a structured representation based upon the informal description.

In a second exemplary aspect of the present invention, a method for deploying computer infrastructure for generating a structured representation from an unstructured description, includes integrating computer-readable code into a computing system. The computer-readable code includes instructions for receiving an unstructured description, and instructions for generating a structured representation based upon the unstructured description.

In a third exemplary aspect of the present invention, a signal bearing medium executable by a digital data processing unit for generating a structured representation from an unstructured description includes receiving an unstructured description, and generating a structured representation based upon the unstructured description.

In a fourth exemplary aspect of the present invention, a system for generating a structured representation from an unstructured description includes means for receiving an unstructured description, and means for generating a structured representation based upon the unstructured description.

To address the above-identified problems, an exemplary embodiment of the present invention provides an approach to using unstructured descriptions of domain information as a basis for structuring the information.

An exemplary embodiment of the present invention allows a user to structure and formalize information according to the rules of a domain, and produce precise structured artifacts from unstructured input, with guidance or automated assistance from the system.

An exemplary embodiment of the present invention uses a domain specific vocabulary and syntax for informally describing information from the domain. This vocabulary should contain sufficient syntactic structure to allow the classification of statements made in the vocabulary.

An exemplary embodiment of the present invention includes an editor for a vocabulary and syntax for informally describing the domain.

An exemplary embodiment of the present invention includes a statement classifier that automatically classifies statements that are expressed using the vocabulary and syntax.

An exemplary embodiment of the present invention uses a formalization meta-model that describes the form that the formalized information should have. This model defines a structure for a formalized version of the information for each statement type that can be represented by a vocabulary and syntax.

An exemplary embodiment of the present invention includes one or more wizards that walks a domain expert through a set of informal information gathering steps and automatically creates instances of meta-model elements based upon the informal information received.

An exemplary embodiment of the present invention includes a wizard for each statement type that may be invoked whenever an action is taken on a classified statement in the editor.

An exemplary embodiment of the present invention uses an approach to check the consistency and completeness of the formalized information. In this manner, a domain expert may be provided with feedback when a problem in the formalization is discovered.

An exemplary embodiment of the present invention is advantageous because it enables the conversion of informal information into a formal representation, which, unlike the informal representation, may be processed by a machine. Formalization using this technique is much simpler than doing it by hand, and only requires learning a structured vocabulary in a natural language. Natural languages are human developed languages such as, for example, English, French, Chinese, and the like.

An exemplary embodiment of the present invention is advantageous in that it may provide a wizard that creates a formal representation for a user merely by receiving input from the user in an informal representation.

An exemplary embodiment of the invention is advantageous because information may be simultaneously available in both informal and formal representations, which may then be reviewed and analyzed by experts and non-experts alike.

An exemplary embodiment of the present invention is advantageous because the conversion of information from an informal representation into a formal representation allows the information to be captured by programming constructs. This enables the information to be executed and reasoned about fully.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIGS. 16 through 24 illustrate various states of operation of a graphical user interface 1600 for structuring and formalizing information in an information technology domain;

DETAILED DESCRIPTION OF EXEMPLARY EMBODIMENTS OF THE INVENTION

Figures 1, 2:
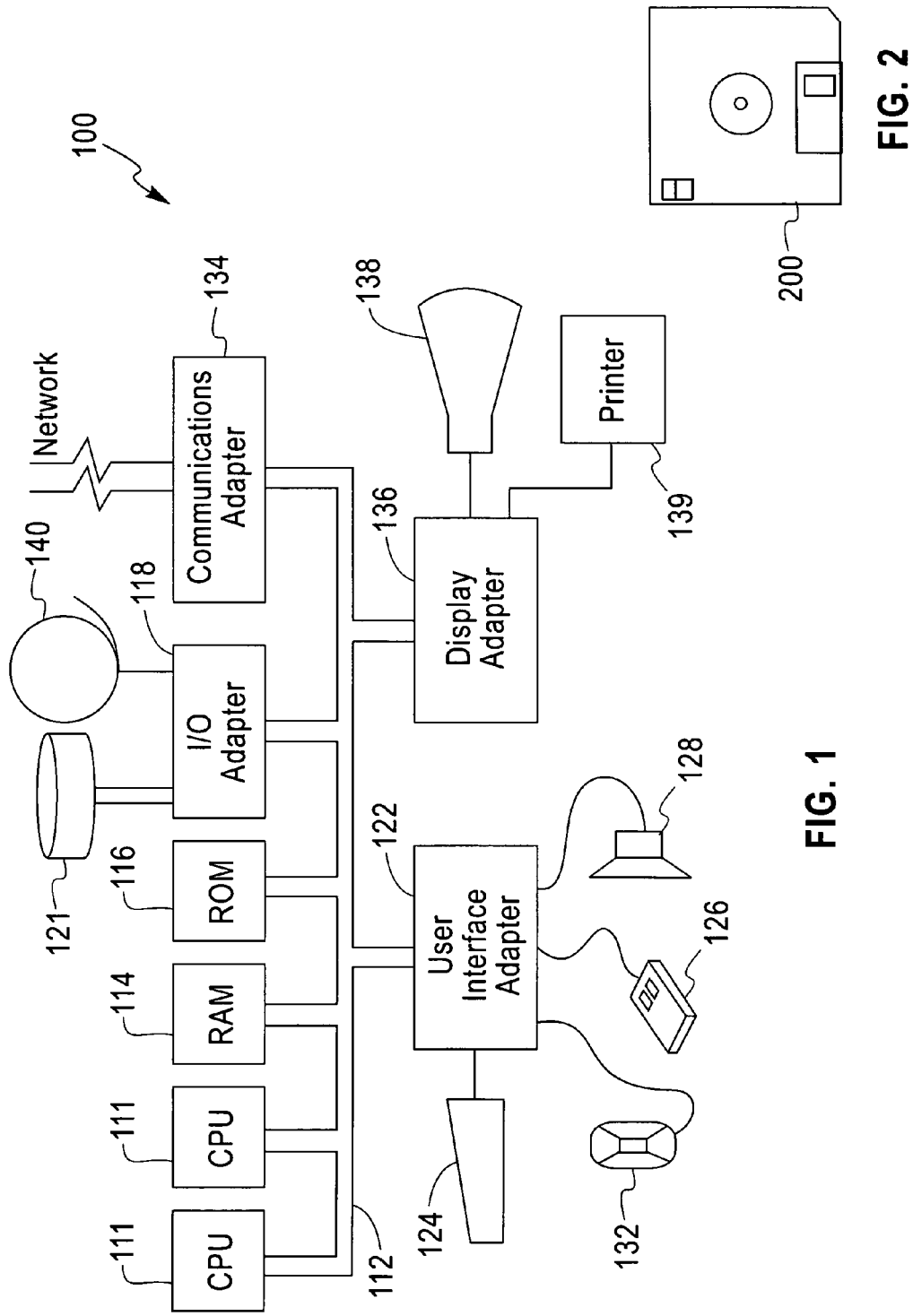
FIG. 1 illustrates an exemplary hardware/information handling system 100 for using and incorporating the present invention therein.
FIG. 2 illustrates a signal bearing medium 200 (e.g., storage medium) for storing steps of a program of a method according to the present invention.

Referring now to the drawings, and more particularly to FIGS. 1-27, there are shown exemplary embodiments of the method and structures of the present invention.

For the purposes of the present description, references to "structured" information or 'structured' representation, are intended to refer to information in which constituents have each been given a particular classification and have been arranged with respect to each other.

Further, while the following description generally refers to structured and unstructured information, one of ordinary skill in the art understands that structured information includes formal information and the like and that unstructured information includes informal information and the like.

References to 'formal' refer not just to 'structured' information, but also to information in which constituents have each been given specific semantics. For example, formal information may include semantics regarding types or classes of objects in a programming language, modeling language, architecture description language and the like. These semantics may have specific constituents or possible values and behavior. Therefore, for example, a reference in the following description to generating a formal artifact according to an identified formalization may include generating a new artifact and imparting particular semantics to the new artifact.

FIG. 1 illustrates a typical hardware configuration of a system 100 for capturing formal and precise information from an informal description in accordance with the invention and which preferably has at least one processor or central processing unit (CPU) 111.

The CPUs 111 are interconnected via a system bus 112 to a random access memory (RAM) 114, read-only memory (ROM) 116, input/output (I/O) adapter 118 (for connecting peripheral devices such as disk units 121 and tape drives 140 to the bus 112), user interface adapter 122 (for connecting a keyboard 124, mouse 126, speaker 128, microphone 132, and/or other user interface device to the bus 112), a communication adapter 134 for connecting an information handling system to a data processing network, the Internet, an Intranet, a personal area network (PAN), etc., and a display adapter 136 for connecting the bus 112 to a display device 138 and/or printer 139 (e.g., a digital printer or the like).

In addition to the hardware/software environment described above, a different aspect of the invention includes a computer-implemented method for performing the methods described below. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising a signal-bearing medium tangibly embodying a program of machine-readable instructions executable by a digital data processor incorporating the CPU 111 and hardware above, to perform the method of the invention.

This signal-bearing medium may include, for example, a RAM contained within the CPU 111, as represented by the fast-access storage for example. Alternatively, the instructions may be contained in other signal-bearing media, such as a magnetic data storage diskette 200 (FIG. 2), directly or indirectly accessible by the CPU 111.

Whether contained in the diskette 200, the computer/CPU 111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

Figure 3:
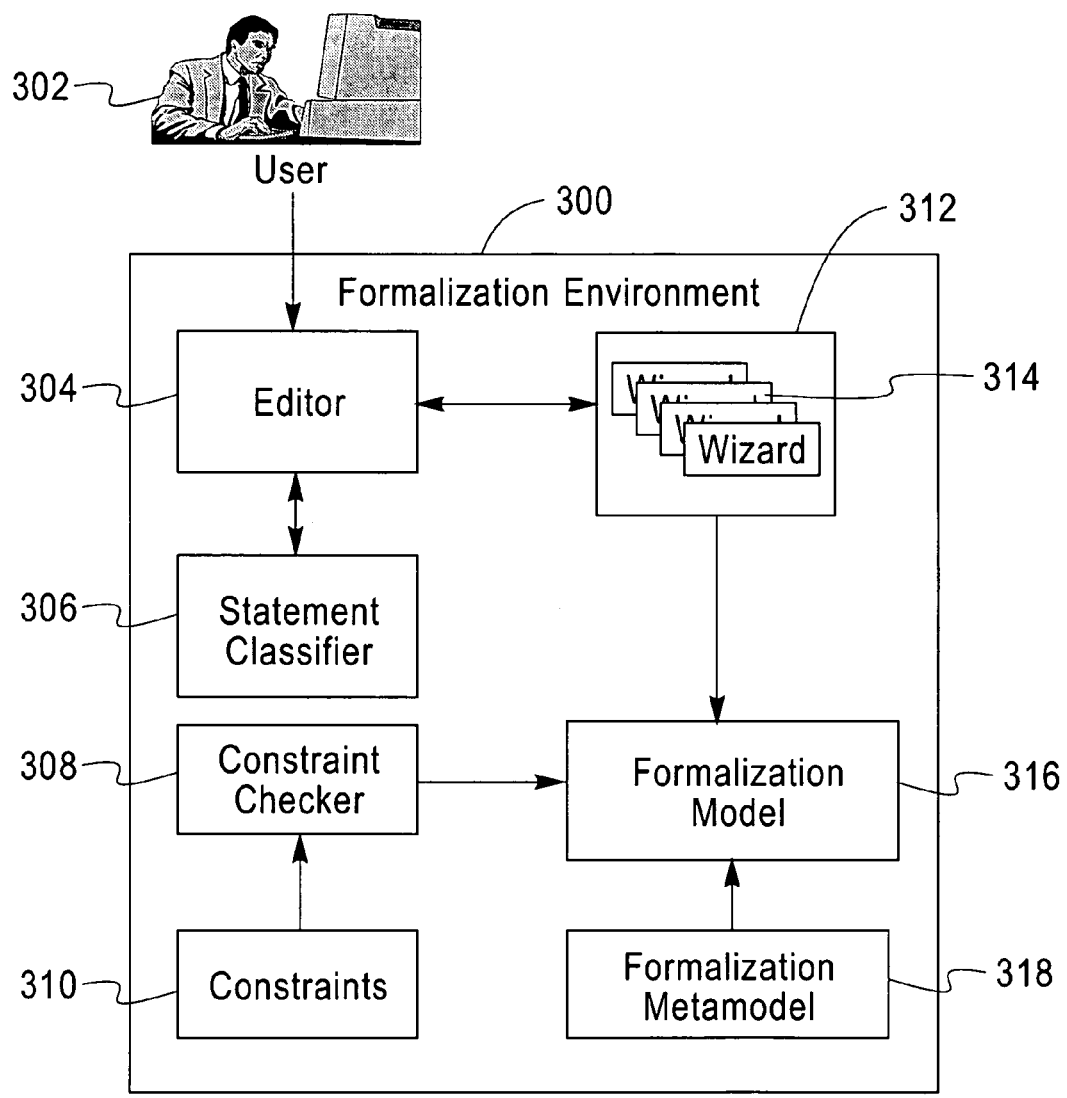
FIG. 3 illustrates a formalization environment 300 in accordance with an exemplary embodiment of the invention.

FIG. 3 illustrates a formalization environment 300 in accordance with an exemplary embodiment of the invention with which a user 302 may obtain a formalized representation of information based upon an informal representation of that information provided by the user 302.

The formalization environment 300 includes an editor 304, a statement classifier 306, a constraint checker 308, a set of constraints 310, a set 312 of wizards 314, a formalized model 316, and a formalization meta-model 318.

Figure 4:
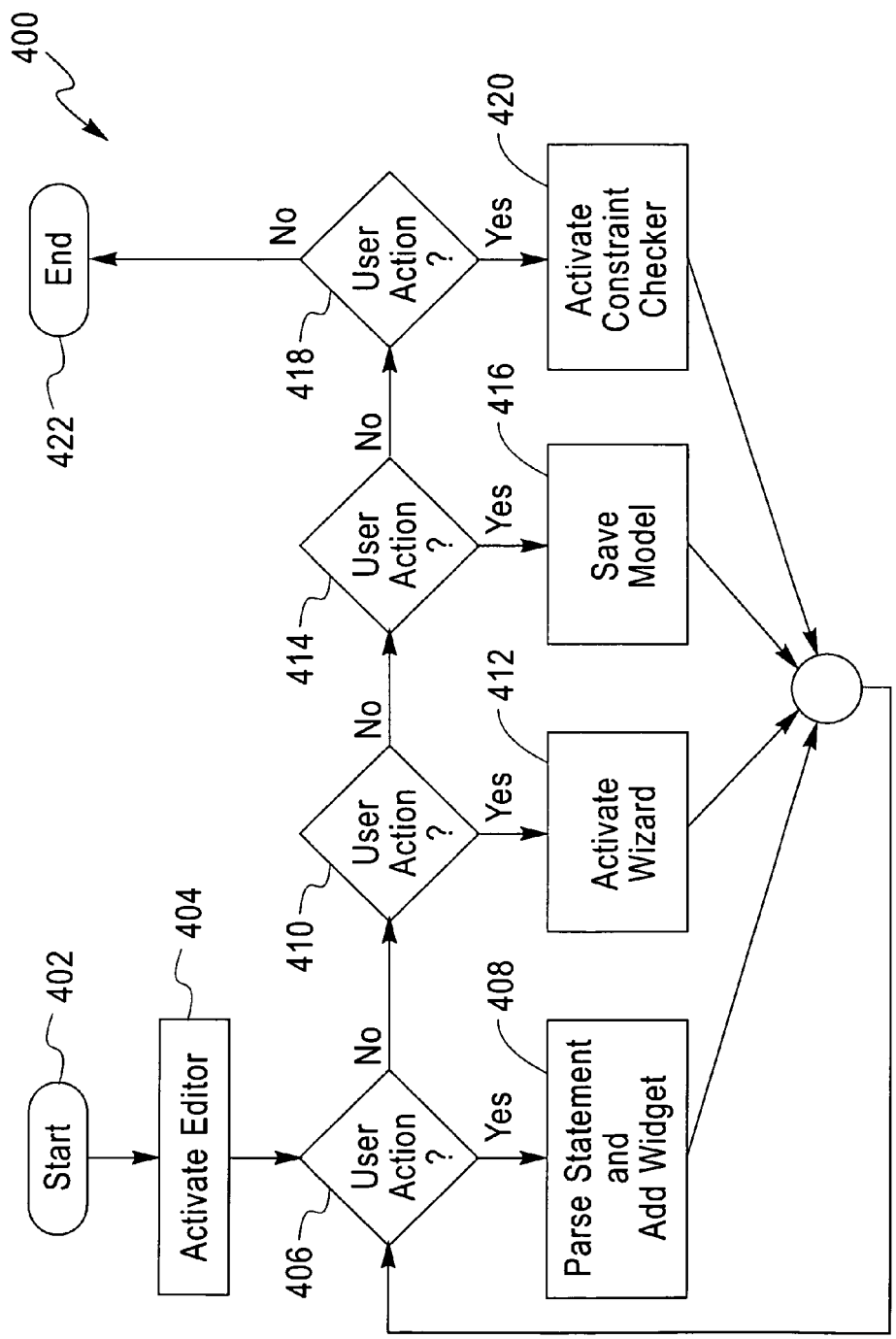
FIG. 4 illustrates a flowchart 400 of an exemplary embodiment of a control routine for performing a method of obtaining a formalized representation of information based upon an informal representation of that information provided by the user in accordance with the present invention

FIG. 4 illustrates a flowchart 400 of an exemplary embodiment of a control routine for performing a method of obtaining a formalized representation of information based upon an informal representation of that information provided by the user in accordance with the present invention.

In an exemplary embodiment of the invention, a user 302 enters an informal description that the user 302 wishes to formalize using the present invention 300. The user 302 uses an appropriate vocabulary for the relevant domain.

The control routine starts at step 402 and continues to step 404. In step 404, the user 302 activates the editor and the control routine continues to step 406.

In step 406, the control routine determines whether a user action indicates an input statement. If, in step 406, the control routine determines that a user action indicates an input statement, then the control routine continues to step 408.

In step 408, the control routine parses the input statement and adds a widget to the input statement and returns to step 406.

If, however, in step 406, the control routine determines that a user action does not indicate an input statement, then the control routine continues to step 410.

In step 410, the control routine determines whether a user action indicates a widget selection. If, in step 410, the control routine determines that a user action indicates a widget selection, then the control routine continues to step 412.

In step 412, the control routine activates the wizard and returns to step 406.

If, however, in step 410, the control routine determines that a user action does not indicate a widget selection, then the control routine continues to step 414.

In step 414, the control routine determines whether a user action indicates a save request. If, in step 414, the control routine that a user action indicates a save request, then the control routine continues step 416.

In step 416, the control routine saves the model and returns to step 406.

If, however, in step 414, the control routine determines that a user action does not indicate a save request, then the control routine continues to step 418.

In step 418, the control routine determines whether a user action indicate a check constraints request. If, in step 418, the control routine determines that a user action indicates a check constraints request, then the control routine continues to step 420.

In step 420, the control routine activates a constraint checker and returns to step 406.

If, however, in step 418, the control routine determines that a user action does not indicate a check constraint request, then the control routine continues to step 422 where the control routine stops.

Operation of an exemplary embodiment of the present invention as illustrated by FIG. 3 to capture a formal model of a software system that automatically generates test cases to test a software system is described below.

When testing a software system, developing an effective and efficient test suite is a complex problem. A test suite is effective if it thoroughly covers combinations of inputs, actions, and sequences of actions, thereby enhancing the likeliness it will encounter defects in the software. A test suite is efficient if it provides such coverage without unnecessary redundancy, which would unduly increase the testing effort.

Typically, when a tester tests a software system, the tester or test program takes an action against the system being tested and receives a result or response back from the tested system. The received result is compared against an expected result to determine if the system is working correctly. The tester then takes another action gets some other response and the tester performs a series of these action/response sequences. Sometime, the order of this sequence depends upon the responses, which were received earlier in the sequence. The number of ways that the sequences may be combined is very large.

The following description refers to the concept of a use case. A use case defines a piece of functionality that is of interest to a user. In other words, the use case presents the tested system in a manner that is similar to a user view of that system. For example, in a word processor a user might want to save a file. The user thinks, "I am going to save a file." Thus, "save file" becomes a use case. A use case may include several steps. In this example, the user might click "save as", type the filename and then click "OK." The system might respond with "That file name already exists, do you want to overwrite it?" and the user responds "Yes." Thus, there are many operations that might happen for a particular use case. Those steps are actions within the use case.

There is another concept referred to by the following description, that concept is called an Actor. For any given software system, there may be many actors. Examples of actors may include a system administrator, a regular user and a customer. Different actors often have permission to only use certain subsets of use cases. Those subsets may overlap.

An exemplary embodiment of the invention also uses the concept of test case, which is a higher level construct than the use case. A test case is a sequence of use cases. Each use case has an outcome that may affect the state of the system and may also provide some feedback to a user. As an example, in the "save file" use case, the feedback to the user may be "file saved." Thus, the state of the system is reflected in the fact that the file was saved.

In order to generate meaningful test cases for a software system, three types of information should be obtained. The first type of information describes the data that will be manipulated by the software system. A second type of information describes rules (e.g., "invariants") that must be satisfied by the software system. A third type of information provides a definition for the behavior of the software.

These three types of information may be modeled using domain data models for the data, constraints on the data models for the invariants, and use cases for the behavior.

All three of these types of information may be captured informally and formalized using an exemplary embodiment of the present invention.

As explained above, use cases are a way to define the behavioral capabilities of a system using scenarios that describe interactions between the software system and its users (also known as actors.) These use cases are described as a sequence of statements, each of which defines a step in the usage of the system.

In an exemplary embodiment of the present invention there are at least the three types of statement steps: input steps, output steps and computation steps. An input step is a step where an actor provides some information to the system. An output step is a step where the system returns some information to an actor. A computation step involves a step in which the system performs a computation.

Figure 5:
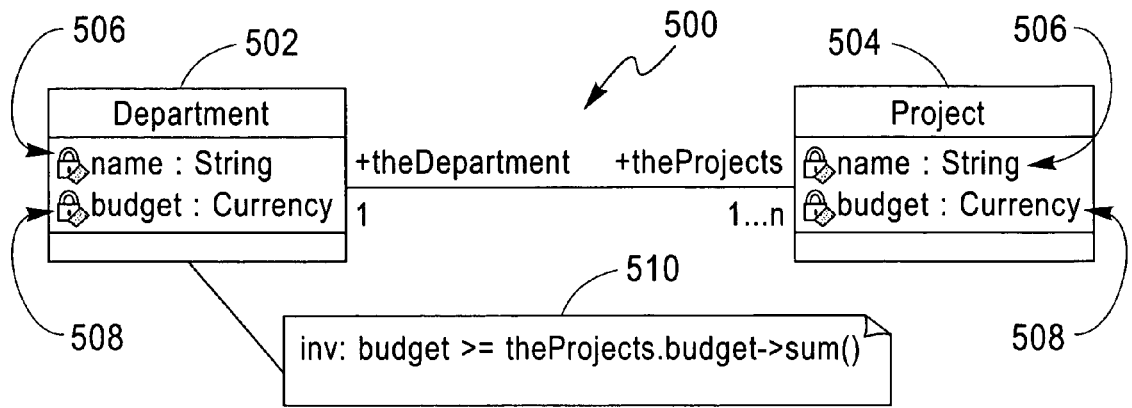
FIG. 5 illustrates an exemplary data domain model 500 for a simple system for managing departments 502 and projects 504.

To illustrate these capabilities, consider the following data domain model 500 for a simple system for managing departments 502 and projects 504 as illustrated by FIG. 5. Both departments 502 and projects 504 have names 506 and budgets 508. Each department 502 may have zero or more projects 504 associated with it. A project 504 is associated with exactly one department 502.

There is an invariant 510 (also known as a business rule) on this model 500, which states that the sum of all of the budgets 508 for the projects 504 in a department 502 cannot exceed that department's 502 budget 508.

Figure 6:
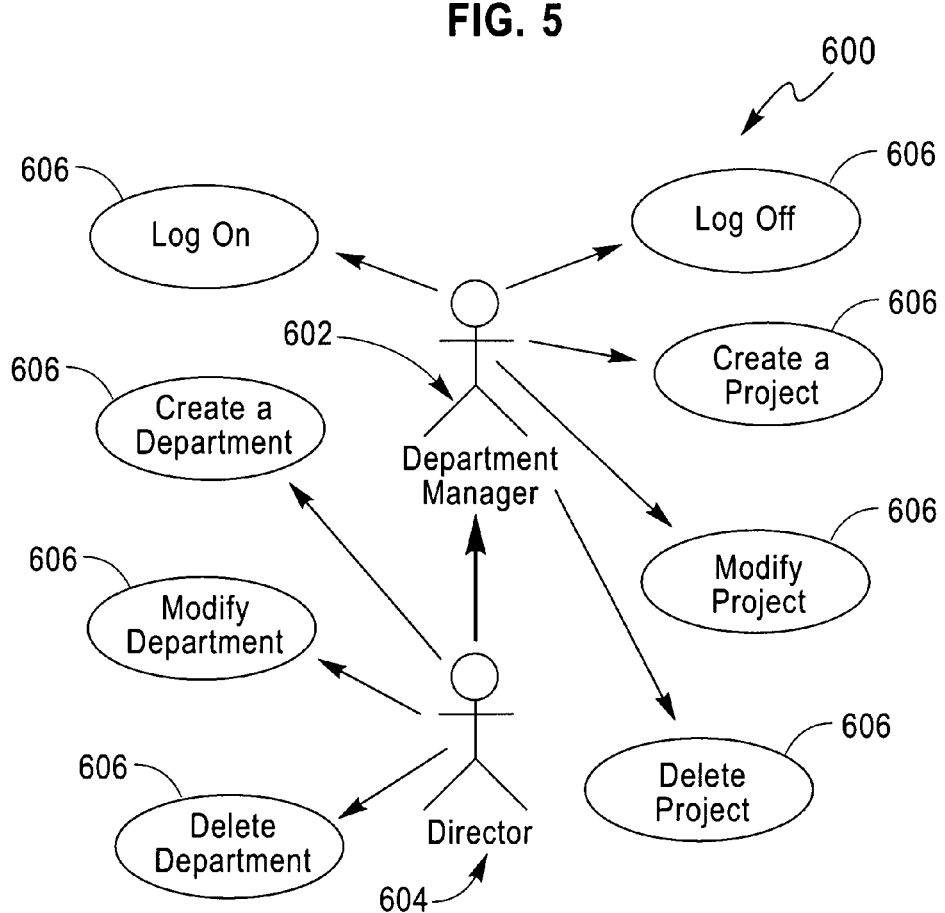
FIG. 6 illustrates an exemplary use case model 600 that illustrates various use cases 606 for the data domain model of FIG. 5.

In addition to the domain data model 500, this example has a use case model 600 that illustrates various use cases 606 illustrated by FIG. 6. There are two actors in this model: a department manager 602, and a director 604 who oversees several departments 502.

Given the use cases 606, an exemplary embodiment of the invention receives an informal sequence of steps detailing the interaction for each particular use case from a domain expert.

For example, for the "Create a Project" use case 606, the system requires authorization for a department manager, queries the department manager for name, department, and budget, receives the name, department, and budget from the department manager, creates a project for that department. In other words, the sequence of steps for the "Create a Project" use case 606 is as follows:

Pre: Department Manager is authorized

1. System queries for name, dept., and budget
2. Department Manager enters name, dept., and budget
3. System creates project associated with specified dept.

The authorization for the department manager is known as a pre-condition because the pre-condition must be satisfied before the remaining steps may be performed.

The query to the department manager is a classified as an output step. The entry of information by the department manager is a classified as an input step and the creation of the project is a classified as a computation step.

Given the above informal software system model, an exemplary embodiment of the present invention creates a formal model in accordance with the following description.

An exemplary embodiment of the present invention first uses a vocabulary and syntax for capturing statements comprising the use case steps.

As explained above, there are three classes of statements: input steps, output steps and computation steps. An exemplary embodiment of the present invention classifies the statements based upon the verb in the statement. In other exemplary embodiments of the present invention, other syntactic structures may be used beyond verbs.

For example, a sample grammar for classification of statements in accordance with an exemplary embodiment of the present invention is illustrated below:

```
Input ::= actorName [enters | selects] information
Output ::= systemName [displays | returns] output to actorName
Computation ::= systemName [creates | computes | updates | deletes]
information
```

In an exemplary embodiment of the present invention the italicized word within each statement may be replaced by free text, which is any natural language text that the user wishes to enter. Thus, a valid computation statement would be:

The ATM system updates the state of the account.

The statement is a computation statement because the statement specifies an update to elements within a system.

An exemplary embodiment of the present invention includes an editor for capturing the statements, and a classifier for classifying statements into types of statements, which are defined by the vocabulary. The classifier classifies the statements in such a manner that the classification can support formalization of the statements once a template/wizard mechanism is provided.

Figure 7:
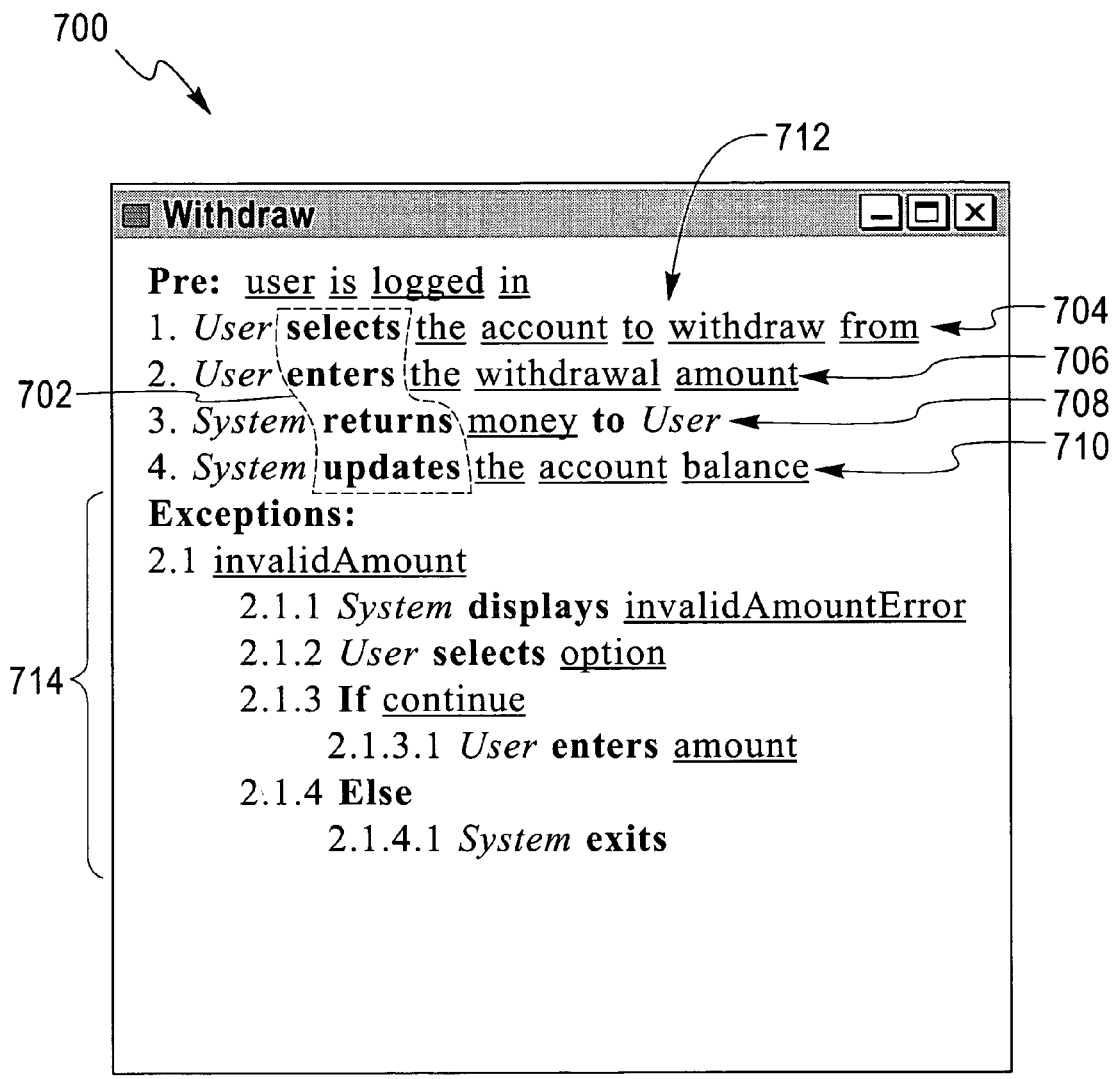
FIG. 7 illustrates an exemplary graphical user interface 700 in accordance with the present invention.
Figure 8:
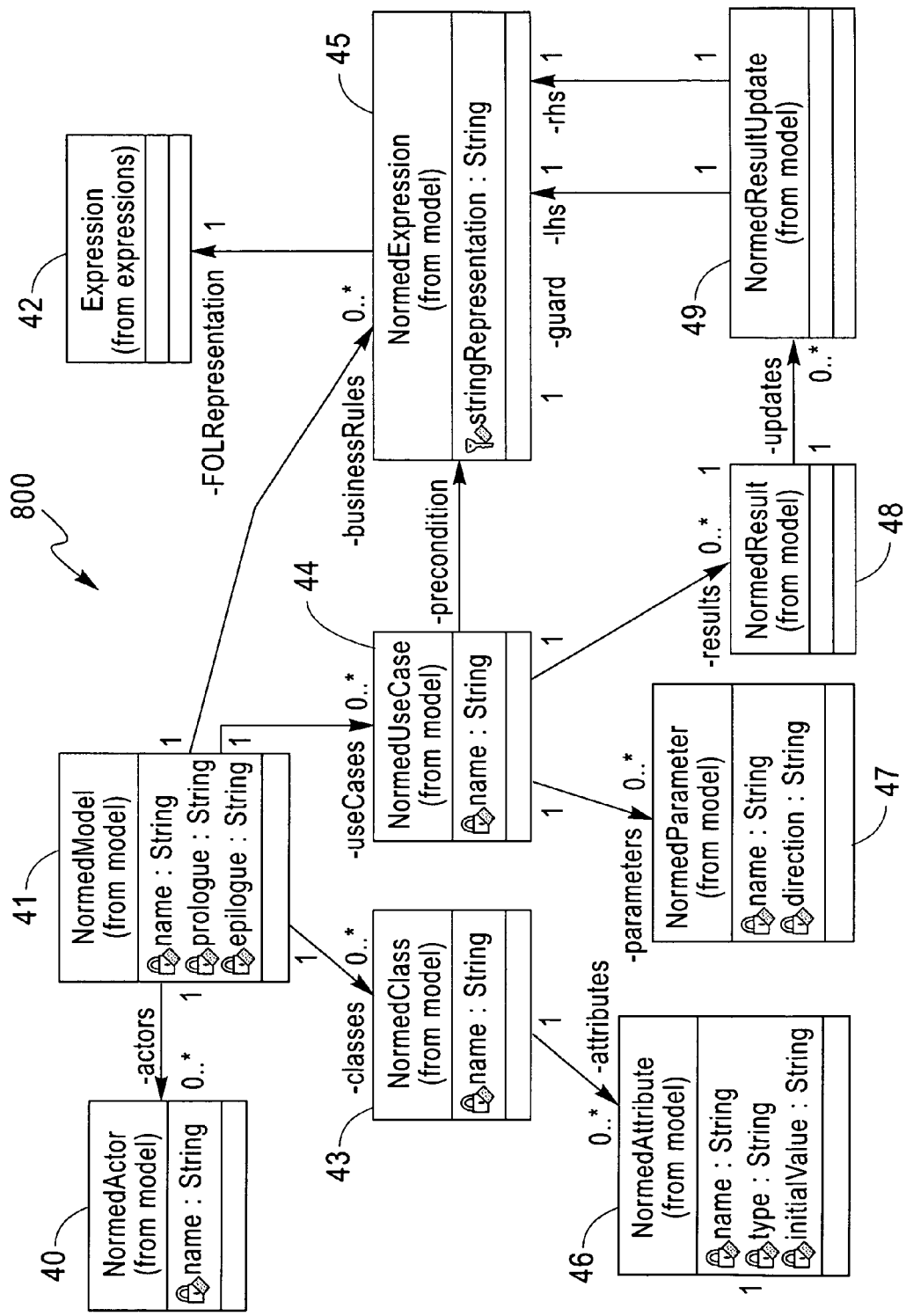
FIG. 8 illustrates an exemplary meta-model 800 for formalizing a use case in accordance with the exemplary embodiment of the present invention.

In the case of the simple language discussed with respect to the example above, as illustrated by FIG. 7, a graphical user interface 700 for the editor 304 may be a simple text editor with an added feature. The graphical user interface 700 may display the verbs 702 for each statement 704-710 in bold type and display the text after the verb 712 as a link element. The editor 304 determines how to display the text within the statements in the graphical user interface 700 based upon the classification of each statement. A user 302 may then "click on" the text displayed as a link 712 in order to prompt the system to launch the appropriate wizard that supports formalization of a corresponding statement.

The graphical user interface 700 also illustrates several "Exception" statements 714 that will not be addressed by this description. However, these grammatical elements can all be handled in the same way.

The exemplary use case that is illustrated by the graphical user interface 700 corresponds to a use case for withdrawing money from an account.

An exemplary meta-model 800 for formalizing a use case in accordance with the exemplary embodiment of the present invention discussed above is illustrated by FIG. 8.

This metamodel shows that a NormedModel 41 (our name for a foramalized model in our exemplary embodiment) contains four things: NormedActors 40, NormedUseCases 44, NormedClasses 43, and business rules, which are NormedExpressions 45. Furthermore, NormedClasses 43 constain NormedAttributes 46. NormedUseCases 44 contain NormedResults 48, which consist of a guard that states when the result occurs, and a set of NormedResultUpdate 49 statements that describe any computations that accompany a given NormedResult 48. The NormedResult 48 guard, the NormedResultUpdates 49, and the business rules are all represented as NormedExpressions 45, which are a common way that our embodiment provides to capture constraints and computation statements.

In accordance with this exemplary embodiment, input statements refer to use case parameters that the user provides to the system. Similarly, output statements refer to use case parameters that the system outputs to an actor. Computation statements refer to state updates on object fields (modeled by classes and attributes) that happen when a particular use case result occurs. The results include guards and the update statements themselves.

For the purpose of this description, guards are constraints on the various results in a use case and update statements are the same as computations.

As explained above, an exemplary embodiment of the invention includes wizards 314 or other helpers that a user may activate using the graphical user interface 700 for the editor 304 to formalize a statement. A wizard is a small program (or piece of a program) that receives information from a user and performs an automated task for the user. In this instance, the wizard 314 is a small program that receives information from the user about a statement in order to formalize that statement.

To enable the use of wizards 314 with the editor 304, an exemplary embodiment of the present invention relies upon a graphical user interface 700 for the editor 304 that displays "marked-up" text within each of the statements. The graphical user interface 700 displays the statement text using a marker that allows a user to identify which statements require formalization. For example, as explained above, the graphical user interface 700 may mark text within the statement by underlining the text 712. In this manner, when a user 302 clicks on a marker 712, an exemplary embodiment of the present invention launches a wizard 314, which helps with the formalization of that statement.

In other words, when an exemplary embodiment of the present invention determines that a user 302 has selected a marker 712 (by, for example, "clicking on a link") then the exemplary embodiment launches a wizard that assists the user in formalizing the statement.

Figure 9:
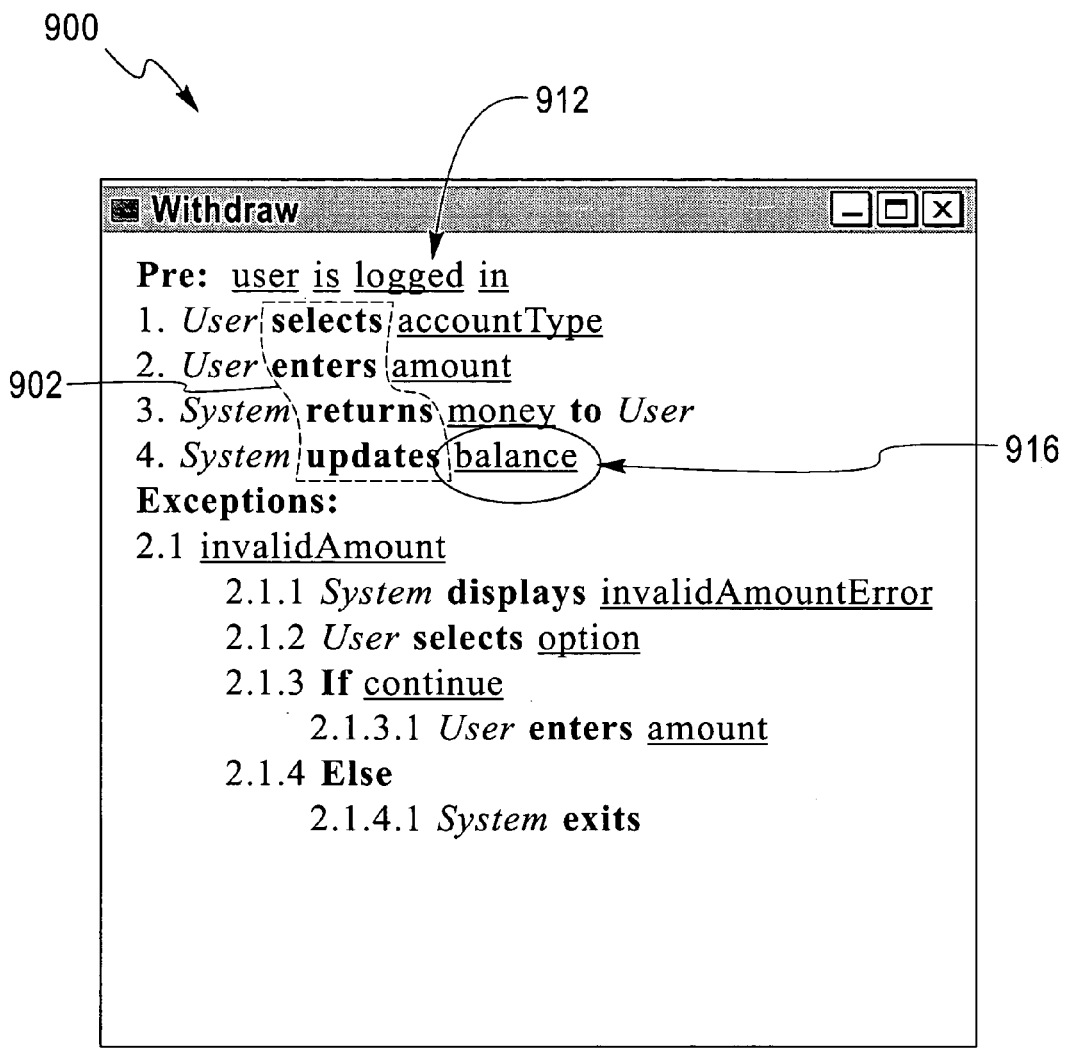
FIG. 9 illustrates an exemplary graphic user interface 900 in accordance with the present invention.
Figure 10:
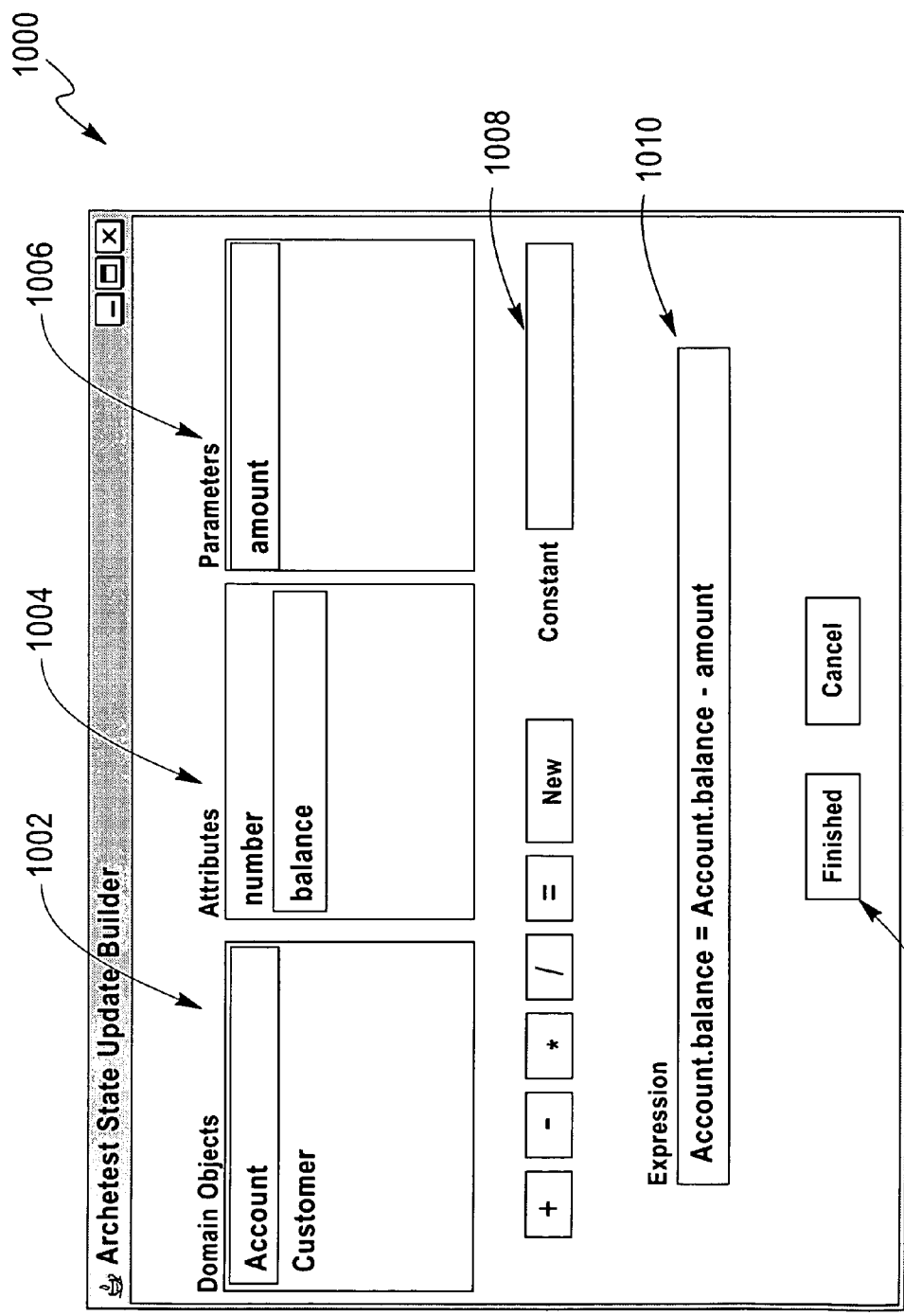
FIG. 10 illustrates an exemplary graphical user interface 1000 for an exemplary wizard 314 in accordance with the present invention.

A graphical user interface 1000 for an exemplary wizard 314 in accordance with the present invention is illustrated by FIG. 10. FIG. 9 shows a graphic user interface 900 with markups on the text 912 following the action verbs 902. With this exemplary embodiment a user 302 clicking on the markup 916 that is circled in FIG. 9 causes an exemplary embodiment of the invention to launch the graphic user interface 1000 for a wizard 314 as illustrated by in FIG. 10.

The graphical user interface 1000 for the wizard 314 allows a user 302 to enter information represented informally in a statement with which an exemplary embodiment of the invention will formalize the statement in terms of both the data model and the input parameters. A user 302 may fill in fields that are presented by the wizard's graphic user interface 1000 and may answer any questions (not shown) that are presented by the wizard's graphic user interface 1000. In the graphical user interface 1000 the user 302 may enter information in a "Domain Objects" field 1002, an "Attributes" field 1004, a "Parameters" field 1006, and a "Constant" field 1008. The graphical user interface 1000 may then present a formalized representation of the statement in the "Expression" field 1010 as the user 302 enters information in the other fields 1002-1008.

After the user 302 has completely filling out the fields 1002-1008 presented by the graphical user interface 1000, the user 302 may activate the "Finished" button 1012 to cause the wizard 314 to save a formalized representation of the statement.

A partial formalization (using eXtended Markup Language) of the withdraw use case as created by an exemplary embodiment of the present invention follows:

```
<UseCase abstract="false">
    <Name>Withdraw</Name>
    <Precondition>let User : domainmodel::atmNew::User =
archetest::domainmodel::atmNew::User.allInstances( )->any(c | true) in
```

-continued

```
User.ucbtAttrloggedOn = true
    </Precondition>
    <Step> 1
        <Input>account
        <Type> archetest::domainmodel::atmNew::AccountType
</Type>
        </Input>
    </Step>
    <Step> 2
        <Input>account
        <Type> Real </Type>
        </Input>
    </Step> 2
    <Step> 3
        <Output> cash
        <Type> Physical Action <\Type>
        </Output>
    </Step>
    </Step> 4
        <Computation>
            let Account :
archetest::domainmodel::atmNew::Account=
archetest::domainmodel::atmNew::Account.allInstances( )->any(c | true),
useCaseInv :
archetest::expressions::UseCaseInvocation =
archetest::expressions::UseCaseInvocation.allInstances( )->any(uc | true),
bindings : Sequence(archetest::expressions::Binding) =
useCaseInv.bindings,
amount : Real = bindings->any(b | b.parameter.name = 'amount').value in
Account.ucbtAttrbalance # Account.ucbtAttrbalance – amount
        </Computation>
    </Step>
</UseCase>
```

In this manner, an exemplary embodiment of the invention creates an instance of one or more meta-classes from the meta-model 318 and populates the formalization model 316 with formalized data based on the information provided by the user 302 using the editor 304 and the wizards 314.

In an exemplary embodiment of the present invention, in step 420, the constraint checker 308 checks to make sure that the constraints 310 are not violated by checking the consistency and completeness of the formalized model. In a given domain, other properties may also be checked (e.g. safety, liveness, and the like).

The constraint checker 308 first checks the consistency based on the fact that for any given set of parameters for a use case, there should be one, and only one result. Completeness implies a related property, which is that every combination of inputs should have a result defined for them.

Constraints in the formalization of a model may be represented by an exemplary embodiment of the present invention using the Object Constraint Language (OCL.) OCL is a formal constraint language for stating invariants on models. Object Constraint Language may be used to constrain any model, including the meta-model used in the formalization. First Order Logic (FOL) is a standard logic providing both universal and existential quantification, as well as the standard propositional operations (not, and, or, implication, and bi-directional implication.) Consistency usually implies checking that the constraints cannot contradict one another, nor may they inject ambiguity by making two outcomes possible. Completeness usually involves checking that a set of constraints forms a tautology.

Figure 12:
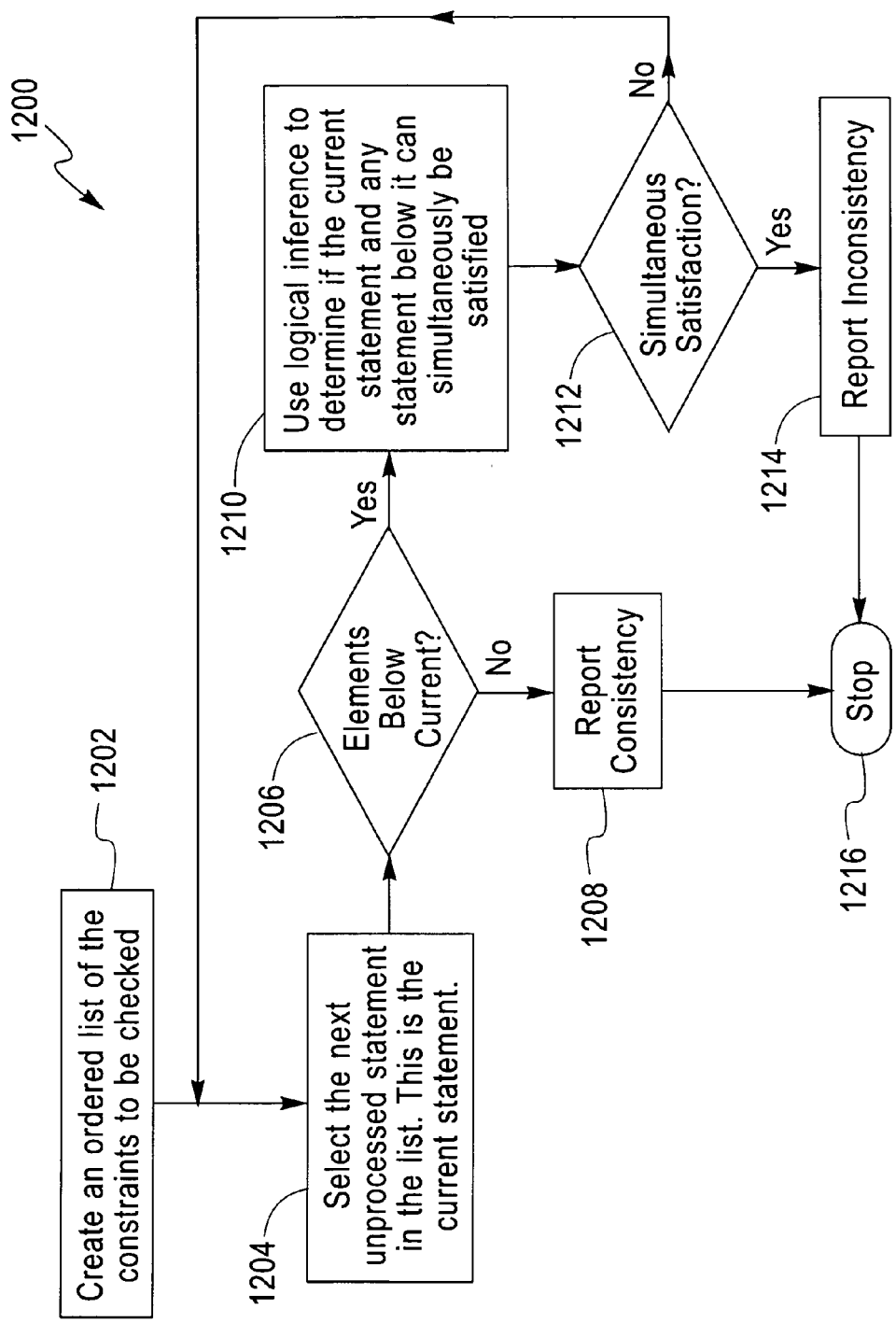
FIG. 12 illustrates a flowchart of an exemplary control routine 1200 for performing a consistency check in accordance with the present invention.

FIG. 12 illustrates a flowchart of an exemplary control routine 1200 for performing a consistency check in accordance with the present invention. The constraint checker 308 starts at step 1202 where an ordered list of constraints to be checked is created and the constraint checker 308 continues to step 1204.

In step 1204, the constraint checker 308 selects the next unprocessed constraint in the list and sets the next unprocessed constraint as a current statement and continues to step 1206.

In step 1206 the constraint checker 308 determines whether there are constraints below the current statement. If, in step 1206, the control routine determines that there are constraints below the current constraint, then the constraint checker 308 continues to step 1210.

In step 1210, the constraint checker 308 uses logical inference to determine if the current constraint and any constraint below the current statement can be simultaneously satisfied and continues to step 1212.

In step 1212, the constraint checker 308 branches depending on whether the current constraint and any constraint below the current statement can be simultaneously satisfied. If, in step 1212, the constraint checker 308 determines that the current constraint and any constraint below the current constraint can be simultaneously satisfied, then the control routine continues to step 1214.

In step 1214, the constraint checker 308 reports the inconsistency to the user and continues to step 1216 where the constraint checker 308 finishes.

If, however, in step 1212, the constraint checker 308 determines that the current constraint and any constraint below the current statement cannot be simultaneously satisfied, then the constraint checker 308 returns to step 1204.

If, however, in step 1206, the constraint checker 308 determines that there are no elements below the current constraint, then the constraint checker 308 continues to step 1208. In step 1208, the constraint checker 308 reports that the model is consistent and continues to step 1216 where the constraint checker 308 stops.

In this manner, the constraint checker 308 checks the consistency of the formalized model.

Figure 13:
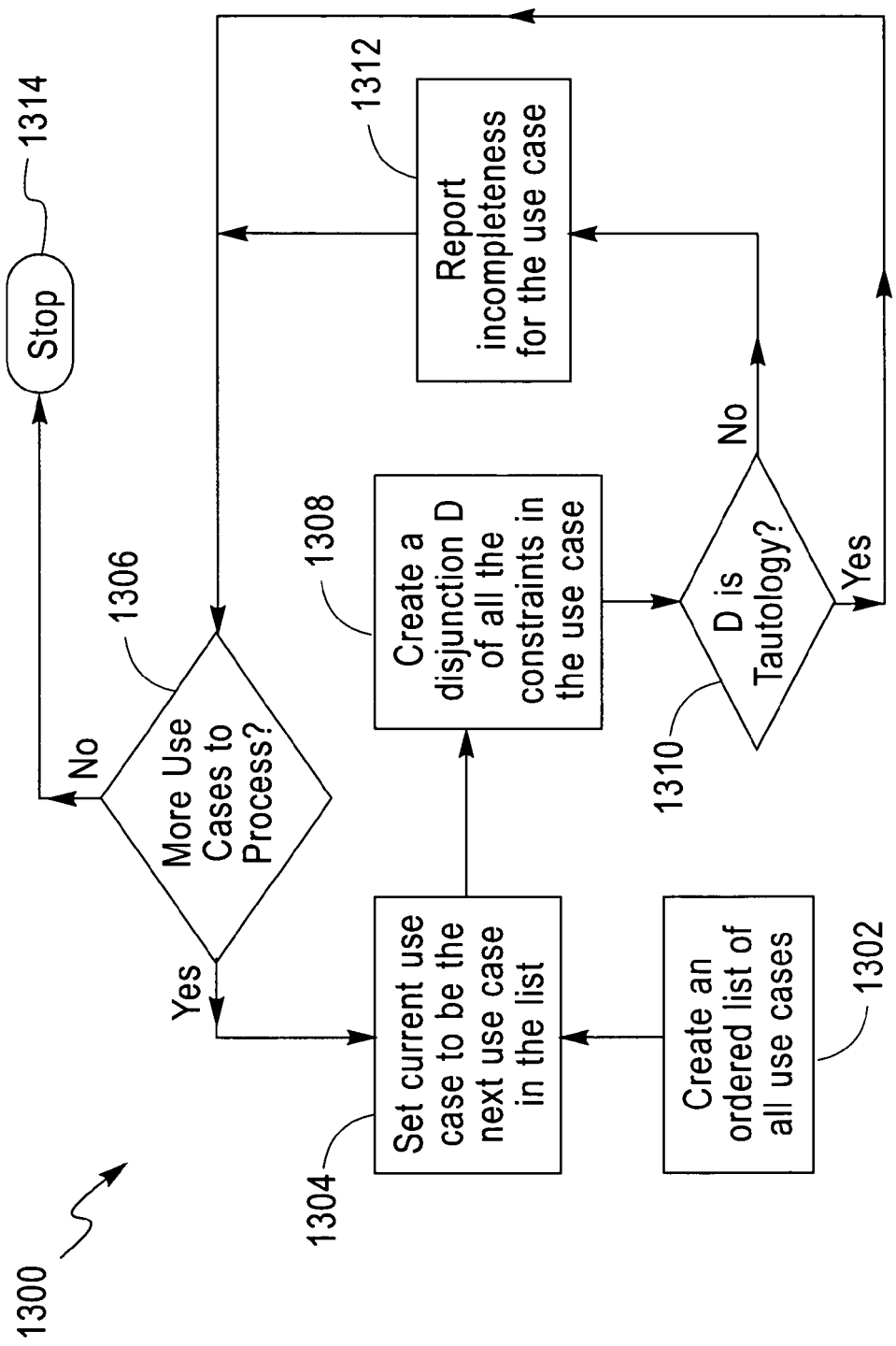
FIG. 13 illustrates a flowchart 1300 of a control routine for checking the completeness of the formalized model in accordance with the present invention.

FIG. 13 illustrates a flowchart 1300 of a control routine for checking the completeness of the formalized model 316. The constraint checker 308 starts at step 1302 and creates an ordered list of all use cases for the domain model and continues to step 1304.

In step 1304, the constraint checker 308 sets the current use case to be the next use case in the list and continues to step 1308. In step 1308 the constraint checker 308 creates a disjunction, D, of all the constraints in the use case and continues to step 1310.

In step 1310, the constraint checker 308 determines whether the disjunction, D is a tautology. If, in step 1310, the constraint checker 308 determines that the disjunction, D is not a tautology, the constraint checker 308 continues to step 1312 and reports the incompleteness for the use case.

If, however, the constraint checker 308 determines in step 1310 that the disjunction, D, is a tautology, then the constraint checker 308 continues to step 1306.

In step 1306, the constraint checker 308 determines whether there are more use cases to process. If, in step 1306, the constraint checker 308 determines that there are more use cases to process, then the constraint checker 308 returns to step 1304.

If, however, the constraint checker 308 determines that there are no more use cases to process, then the constraint checker 308 continues to step 1314 where operation of the constraint checker 308 stops.

In this manner, an exemplary embodiment of the constraint checker 308 may check the completeness of the formalized model.

Another example of an application in which an exemplary embodiment of the present invention is useful is illustrated with reference to FIGS. 14 and 15.

In this second example, the present invention may be used to generate a complex travel plan. In this example, a grammar similar to the one for use cases described above may be defined, which allows a user to talk about travel dates, cities, airlines, hotels, rental cars, restaurants, attraction, and the like. With the present invention, the user would then be able to describe a desired trip in an informal format as a sequence of steps.

For example, a user might present the following sequence of trips for a trip from New York to Paris:
1. Fly from N.Y. to Paris on Dec. 22, 2005.
2. Stay for 3 days.
3. Eat at L'Entrecote on Dec. 23, 2005
4. Travel by train from Paris to Carcassonne on Dec. 26, 2005
5. Stay in Carcassonne for 7 days.
6. Return to Paris on Jan. 2, 2006
7. Stay 1 night.
8. Return to N.Y. on Jan. 3, 2006

Given this description, an exemplary embodiment of the invention will formalize the description of the trip that can be automatically be processed by a machine such as a computer, and the like. For the purposes of simplicity, the following description will only consider travel, hotel, booking, and dining choices, although, one of ordinary skill in the art understands that an exemplary embodiment of the present invention may advantageously be useful for formalizing all aspects of a trip.

Figure 11:
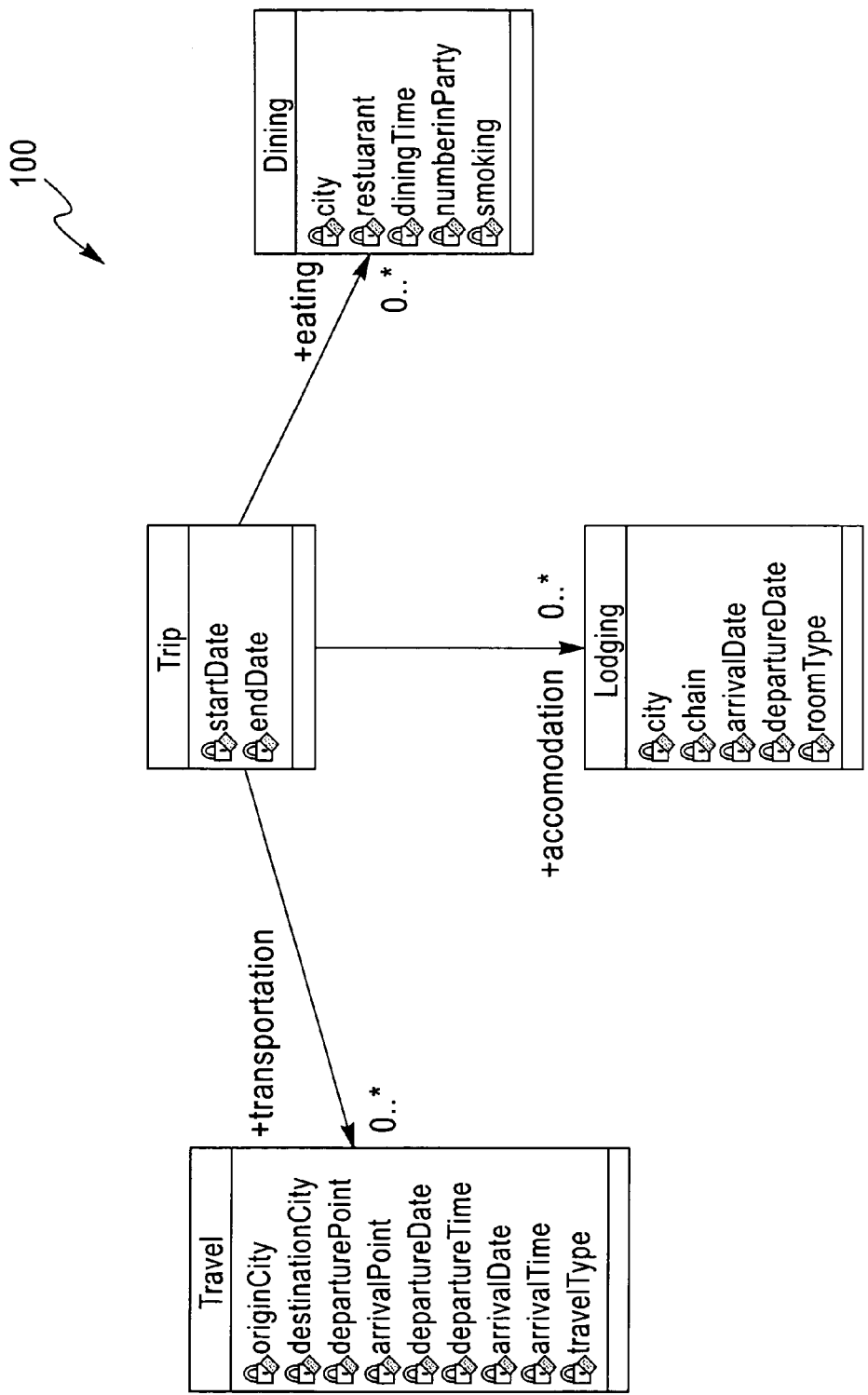
FIG. 11 illustrates an exemplary meta-model 1100 in accordance with the present invention.

Given the statement types in the above trip description, a meta-model 318 that will be used for formalizing the statements will need to be provided to the formalization environment 300. An exemplary meta-model 1100 incorporating the features that are necessary is illustrated by FIG. 11.

Given the language and the meta-model 1100, wizards 314 are now provided, which will be used to further refine the information captured by the informal description.

Figure 14:
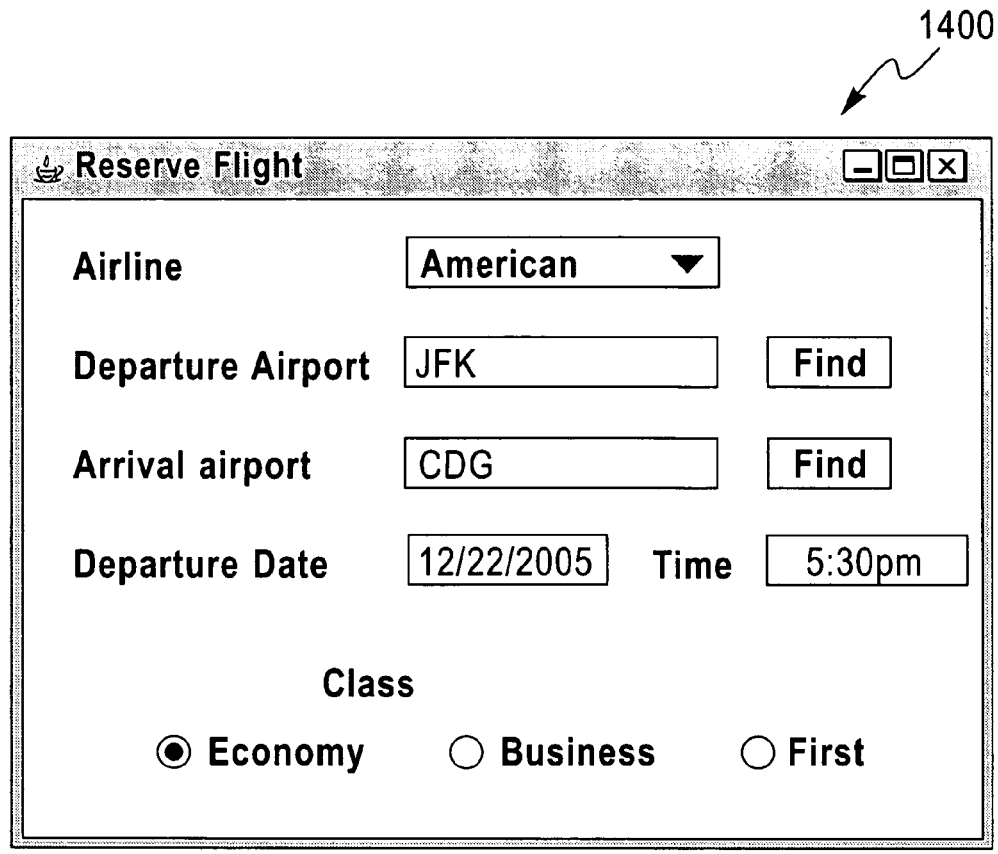
FIG. 14 illustrates an exemplary graphical user interface 1400 for a wizard 314 for formalizing a "Reserve Flight" use case statement in accordance with the present invention.
Figure 15:
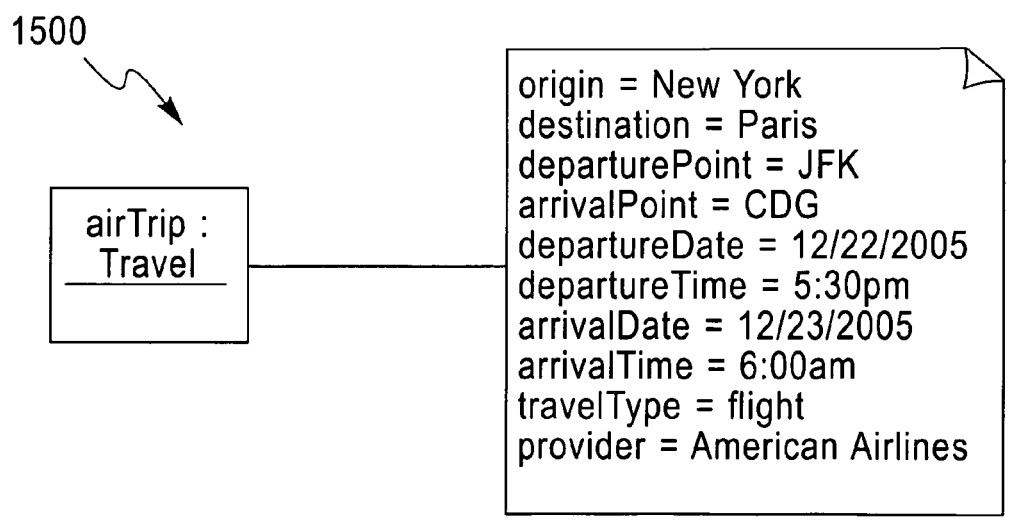
FIG. 15 illustrates a formalized statement 1500 created using the graphical user interface 1400 of FIG. 14.

FIG. 14 illustrates an exemplary graphical user interface 1400 for a wizard 314 for formalizing a "Reserve Flight" use case statement. This graphical user interface 1400 corresponds to the first statement in the informal description provided above. In a manner similar to that described previously, a user enters information into the graphical user interface 1400 and the wizard 314 takes the input information and creates a formalized statement 1500 as illustrated by FIG. 15.

A third exemplary embodiment of this invention serves as a tool for a user to structure information in the domain of Information Technology ("IT") Systems Architecture. For the purposes of the present description, information technology may refer to IT systems architecture as defined in *A standard for architecture description* by R. Youngs, D. Redmond-Pyle, P. Spaas, and E. Kahan, IBM Systems Journal 38(1) 1999, p. 32-50.

Figure 16:
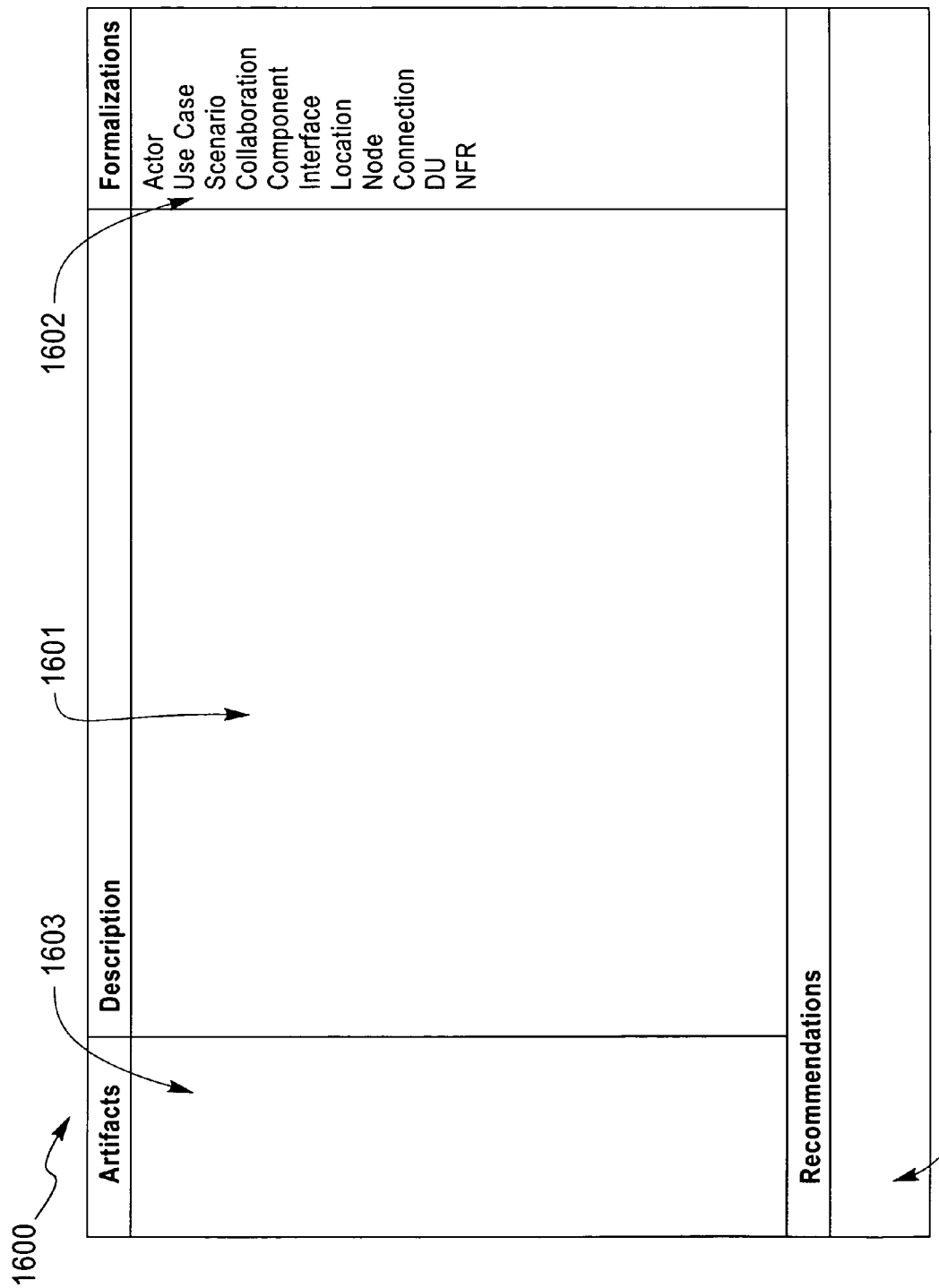

Referring again to the drawings, and more particularly to FIG. 16, FIG. 16 shows an exemplary graphical user interface 1600 in accordance with the present invention.

In an exemplary embodiment, the graphical user interface 1600 might be realized as an extension of a platform such as Eclipse, which is described in *Eclipse: A Platform Becomes an Open-Source Woodstock* by A. Wolfe, ACM Queue 1(8) November 2003, p. 14-16.

The graphical user interface 1600 includes a description area 1601, into which the user may input an informal description that includes unstructured information and in which the user may identify a portion of the informal description, a Formalizations area 1602, in which candidate formalizations may be listed and in which the user may identify a formalization, an Artifacts area 1603, in which formal artifacts may be listed that have been generated according to an identified formalization based on an identified portion of the informal description, and a Recommendations area 1604, in which recommendations output by the tool may appear.

In this exemplary embodiment, the candidate formalizations relate to artifacts from the domain of IT systems architecture as may be, for example, defined in the Youngs et al. reference, including: Actor, Use Case, Scenario, Collaboration, Component, Interface, and the like.

In this exemplary embodiment, a list of candidate formalizations may be predefined. FIG. 16 illustrates a graphical user interface 1600 immediately after a formalization routine in accordance with the invention has been started, and before the user has performed any actions.

Figure 26:
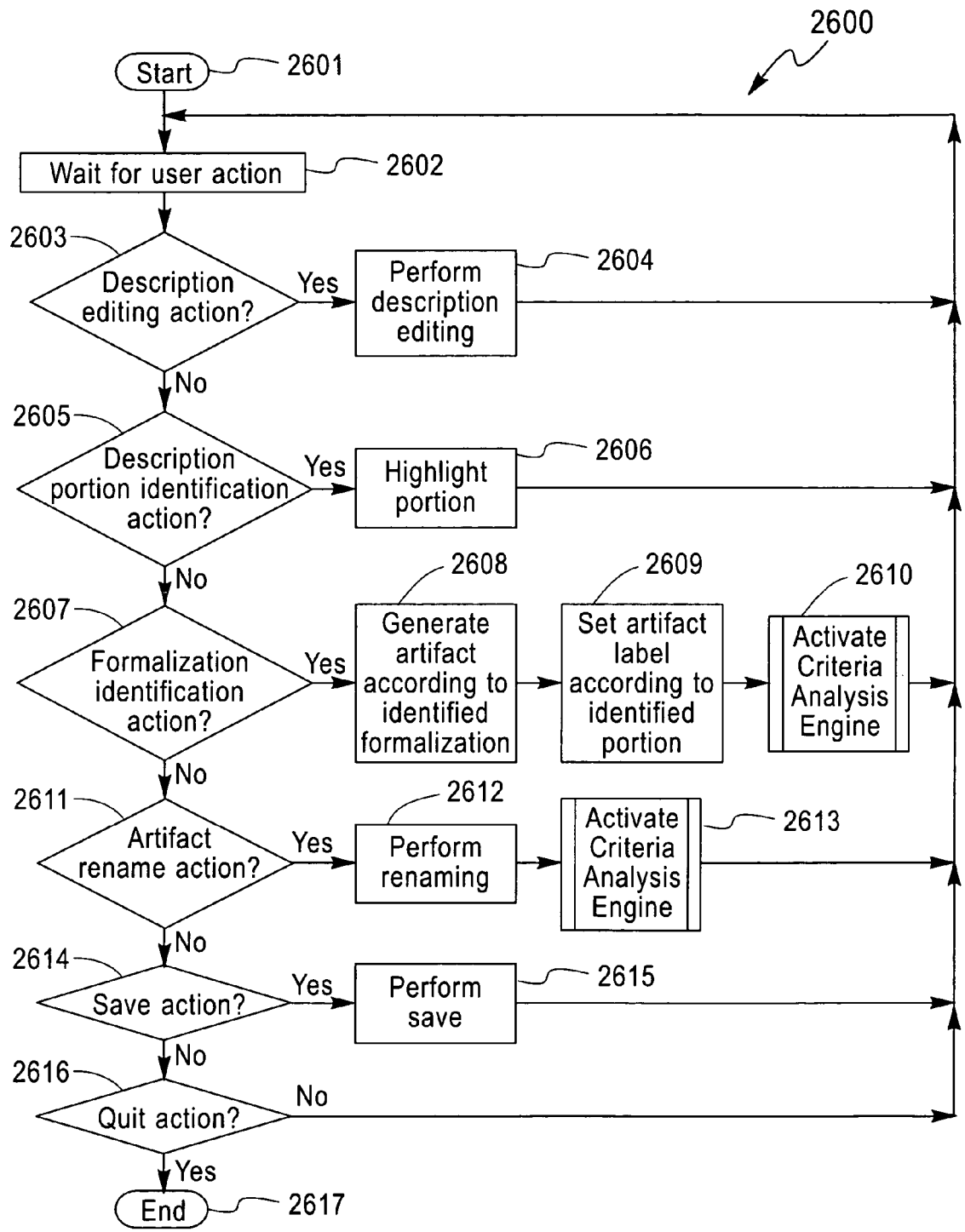
FIG. 26 illustrates a flowchart 2600 for a formalization routine in accordance with an exemplary embodiment of the present invention.

FIG. 26 illustrates a flowchart for an exemplary control routine 2600 for converting unstructured information into structured information in accordance with the present invention.

Referring now to FIGS. 16-26, operation of an exemplary embodiment of the present invention will be described.

The formalization routine starts at step 2601 and continues to step 2602. In step 2602, the formalization routine waits for the user to perform an action. Upon receiving a user action the formalization routine continues to step 2603.

In step 2603, the formalization routine determines whether the user action is a description editing action. For example, the formalization routine may determine that a user performs an editing action in the Description area 1601. If in step 2603, the formalization routine determines that the user action is a description editing action, then the tool continues to step 2604. In step 2604, the formalization routine edits the description and returns to step 2602.

In an exemplary embodiment of the present invention, an editing action may simply be a conventional editing of text or graphics, as might be found in any number of commonly available editing applications.

For example, in an exemplary embodiment of the present invention, a standard editor, such as the OpenOffice word processor, or the Firefox HTML browser in editing mode, may be used with the present invention.

Further, an exemplary embodiment of the present invention may use a standard editor with a wrapper that provides access for the formalization routine to the editor content as well as providing control of the editor by the formalization routine. Exemplary editing actions which may be supported include pasting content into the area, selecting portions of the content, deleting or inserting content, changing the format of content, and the like.

Referring again to FIG. 26, in step 2605 the formalization routine determines whether a user action is a portion identification action. If, in step 2605, the formalization routine determines that a user action is a portion identification action, then the formalization routine continues to step 2606, where the formalization routine highlights the portion identified by the portion identification action and returns to step 2602.

For example, FIG. 17 shows the appearance of the graphical user interface 1600 after some content has been placed into the description area 1700. In this example, the content concerns requirements for a record company's music web site and the user performs a portion identification action in the Description area 1601.

As explained above, the present invention is capable of recognizing the portion identification action in step 2605 and, in response, the formalization routine continues to step 2606 where the formalization routine highlights the portion of the description that was identified by the portion identification action.

In an exemplary embodiment of the invention, the portion identification action may simply be a standard selection action, such as might be used to select a phrase in the OpenOffice word processor (e.g. double-clicking on a word, dragging the cursor over a phrase, and the like).

In an exemplary embodiment of the invention, highlighting an identified portion may simply be a standard indication of selection, such as might be used to indicate a selected phrase in the OpenOffice word processor (e.g. changing the phrases background and foreground color).

Figure 18:
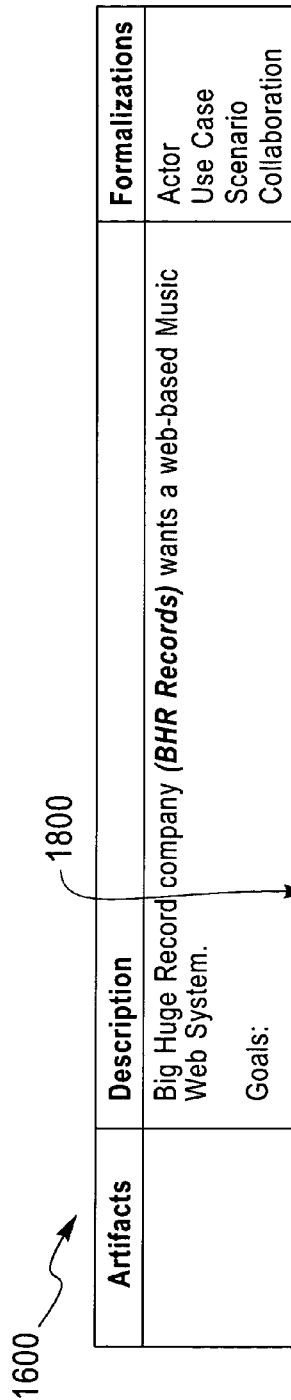

If, however, in step 2605, the formalization routine determines that the user action is not a portion identification action, then the formalization routine continues to step 2607 In step 2607, the formalization routine determines whether the user action is a formalization identification action. As an example, FIG. 18 illustrates the graphical user interface 1600 after the word 'artists' 1800 has been identified by a user and FIG. 19 illustrates the graphical user interface 1600 after the user has identified the 'Actor' formalization 1900.

If, in step 2607, the formalization routine determines that the user action is a formalization identification action, then the formalization routine continues to step 2608.

In step 2608, the formalization routine generates a formal artifact 2608 according to the identified formalization 1900 based on the identified portion 1800 of the informal description and continues to step 2609. In step 2609, the formalization routine sets a label for the generated formal artifact according to the identified portion 1800 of the description and continues to step 2610 where the formalization routine applies a Criteria Analysis Engine, an example of which is described below with reference to FIG. 27.

FIG. 20 illustrates the graphical user interface 1600 in which the formal Actor artifact labeled 'artists' 2000 has been generated.

In this manner, with an exemplary embodiment of the present invention, a user may indicate that an IT system must interact with external users called "artists" and may formalize that indication as an artifact in the structured representation of the architecture of the system.

FIG. 21 illustrates the graphical user interface 1600 after the phrase 'post news' 2100 has been identified and as the user identifies the Use Case formalization 2101.

FIG. 22 illustrates the graphical user interface 1600 after the post news artifact 2200 has been generated in accordance with the Use Case formalization 2101.

In this manner, a user may identify a portion of an informal description as corresponding to a Use Case formalization and obtain a formalized artifact in a structured representation of a system based upon that identification.

Figure 27:
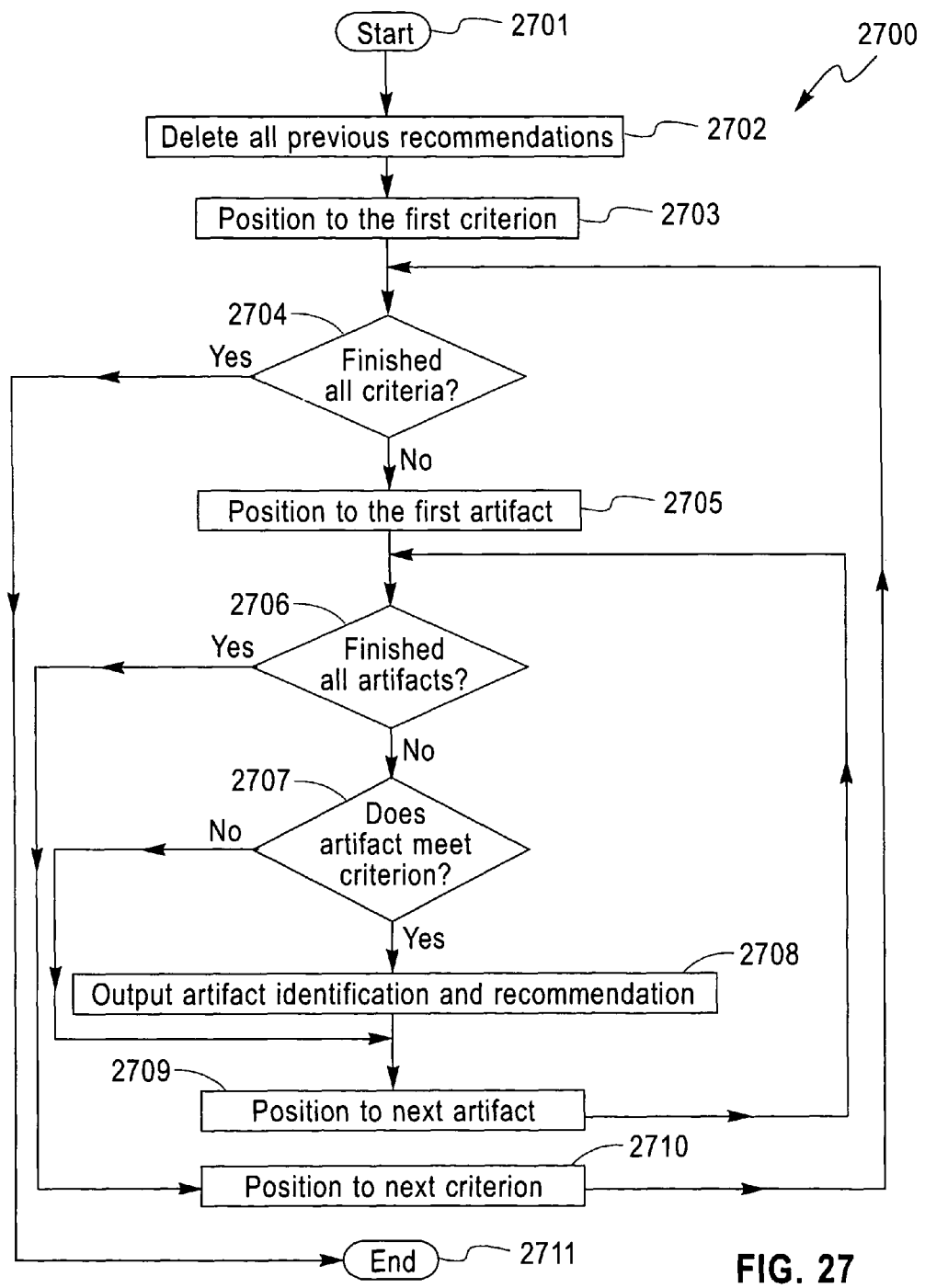
FIG. 27 illustrates a flowchart 2700 for a criteria analysis engine in accordance with an exemplary embodiment of the present invention.

FIG. 27 illustrates a flowchart 2700 for a criteria analysis engine in accordance with an exemplary embodiment of the invention. The criteria analysis engine may be initialized by the formalization routine in steps 2610 or 2613 of FIG. 26.

The criteria analysis engine starts at step 2701 and continues to step 2702 where the criteria analysis engine deletes any previous recommendation that may have been provided in the recommendations area 1604 of the graphical user interface 1600.

The criteria analysis engine then continues to step 2703 where the criteria analysis engine positions to the first criterion of a set of criteria concerning formal artifacts and continues to step 2704.

In an exemplary embodiment, the set of criteria may be predefined. For the purposes of this description, a criterion concerning a formal artifact may include a condition concerning a property of a formal artifact. For example, a criterion might be "a Use Case artifact whose label does not consist of a first string, referred to as an 'identifier', followed by an underscore character, followed by a second string."

In an exemplary embodiment, a criterion might be expressed using a pattern or regular expression as defined in the Perl programming language a description of which may be found in *Programming Perl* by L. Wall, T. Christiansen, and J. Orwant, "($3^{rd}$ Edition)", O'Reilly, July 2000.

As another example of a criterion, a criterion might be "a Use Case artifact for which there is no corresponding Scenario artifact where the Use Case artifact label identifier is a prefix of the Scenario artifact label identifier". One generally skilled in the art appreciates that many other kinds of criteria are possible without limitation in accordance with the present invention.

Referring again to FIG. 27, in step 2704, the criteria analysis engine determines whether all criteria have been processed. If, in step 2704, the criteria analysis engine determines that all criteria have been processed, then the control routine continues to step 2711 where the criteria analysis engine ends.

If, however, in step 2704, the criteria analysis engine determines that all criteria have not been processed, then the criteria analysis engine continues to step 2705 where the criteria analysis engine positions to the first artifact and continues to step 2706.

In step 2706, the criteria analysis engine determines whether all artifacts have been processed. If, in step 2706, the criteria analysis engine determines that all artifacts have been processed, then the criteria analysis engine continues to step 2709.

In step 2709, the criteria analysis engine positions to the next criterion and returns to step 2704.

If, however, in step 2706, the criteria analysis engine determines that all artifacts have not been processed, then the criteria analysis engine continues to step 2707 where the criteria analysis engine determines whether the artifact at which the criteria analysis engine is positioned meets the criterion at which the criteria analysis engine is positioned.

If, in step 2707, the criteria analysis engine determines that the artifact does meet the criterion, then the criteria analysis engine continues to step 2708 where the criteria analysis engine produces an output in the Recommendations area 1604 identifying the artifact. The criteria analysis engine then continues to step 2709.

In this embodiment, a label of an artifact is produced as output. Additionally, a recommendation concerning the artifact may be produced as output in the Recommendations area 1604.

If, in step 2707, the criteria analysis engine determines that the artifact does not meet the criterion, then the criteria analysis engine continues to step 2709.

Referring again to FIG. 22, FIG. 22 illustrates the appearance of the graphical user interface 1600 after a formal Use Case artifact 2200 labeled "post news" and a recommendation 2201 have been output.

An example of a recommendation may include guidance concerning an additional action that a user might wish to perform as part of the process of structuring and formalizing the informal description. Recommendations may be based on the current state of the set of artifacts that have already been generated. In this exemplary embodiment recommendations are not based solely on some static definition of the process and are not something that must be attended to by the user immediately, or even at all. Rather, for this exemplary embodiment a recommendation is something that the user might wish to attend to whenever the opportunity arises.

In an exemplary embodiment of the present invention, a recommendation is not an indication of an inconsistency or other error. Rather, a recommendation may indicate a way in which the current state of a (growing) structured representation may be improved.

The exemplary recommendation 2201 that is illustrated in FIG. 22 is a recommendation that the label be changed to conform to a convention that labels consist of a first string, referred to as an 'identifier', followed by an underscore character, followed by a second string.

In this exemplary embodiment, whenever there is a change to the state of the set of artifacts that have already been generated (as, for example, described with reference to steps 2609 and 2612), the set of recommendations may be recomputed.

In this exemplary embodiment, the entire set of recommendations may be recomputed each time. However, one of ordinary skill in the art understands that the set of recommendations could be updated incrementally, considering only those artifacts, criteria, and recommendations which could have been affected by the most recent change of state in accordance with the present invention.

Referring again to FIG. 27, in step 2708, the criteria analysis engine positions to the next artifact and returns to step 2706. Similarly, in step 2709, the criteria analysis engine positions to the next criteria and returns to step 2704.

Figure 23:
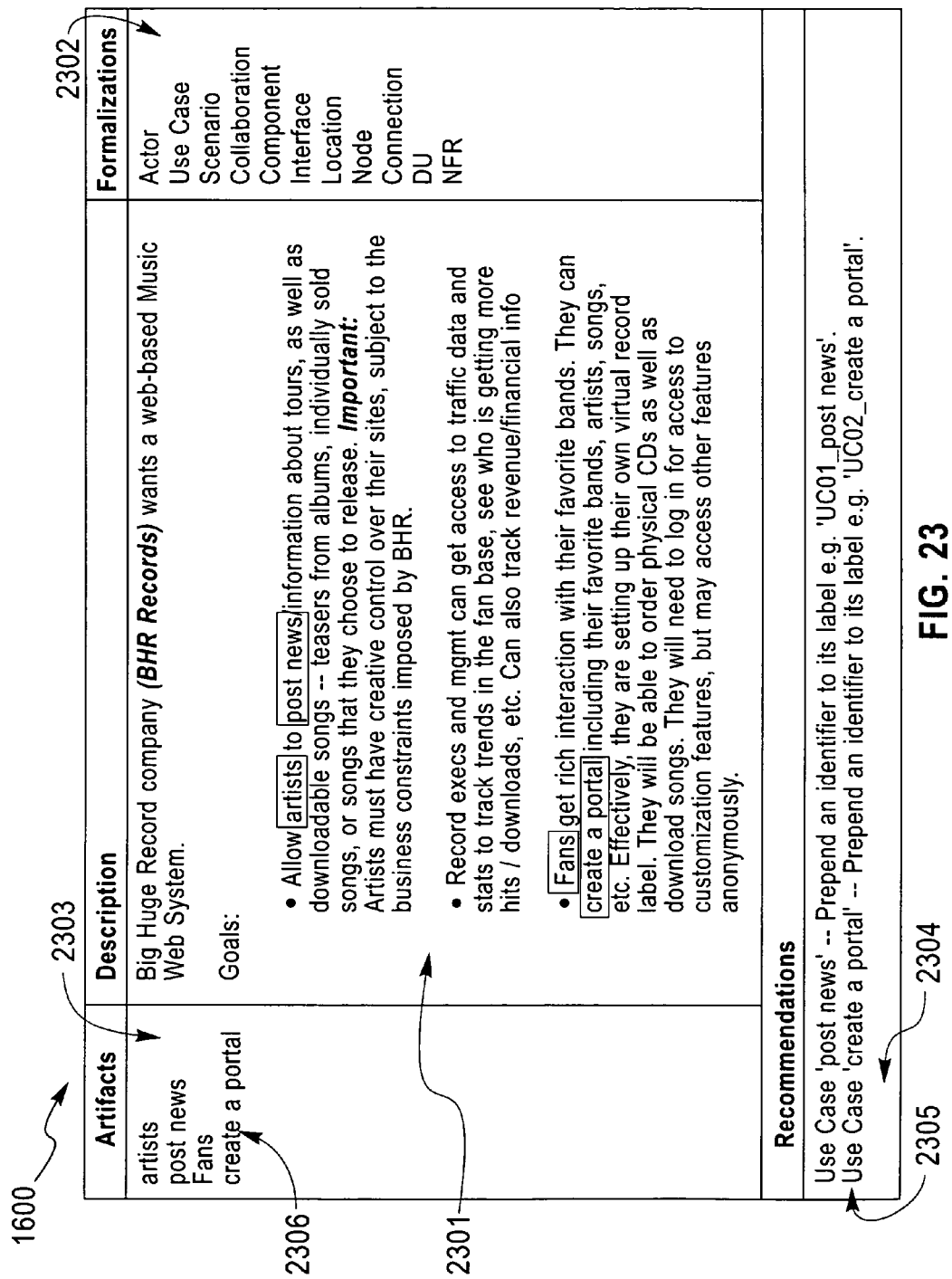

FIG. 23 illustrates the graphical user interface 1600 after a number of portions of the informal description have been identified in the Description area 2301, a formalization from the Formalizations area 2302 has been identified in each case, a formal artifact has been generated accordingly in each case, the formal artifact has appeared in the Artifacts area 2303 in each case, and corresponding recommendations have appeared in the Recommendations area 2304.

Referring again to FIG. 26, in step 2611, the control routine determines whether the user action is an artifact rename action. If, in step 2611, the control routine determines that the user action is an artifact rename action, the control routine continues to step 2612.

In step 2612, the control routine performs the renaming of the artifact in accordance with a user's instructions and continues to step 2613 where the criteria analysis engine is applied. The control routine then returns to step 2602.

In this exemplary embodiment, the rename action by the user may include double-clicking a formal artifact in the Artifacts area 1603, and entering a new label for it.

FIG. 24 illustrates the graphical user interface 1600 after a user has responded to a recommendation 2305 by performing a rename action to change the label of Use Case artifact 2306 from 'create a portal' to 'UC01_Create portal' resulting in the Use Case artifact 2400 being labeled 'UC01_Create portal'.

Additionally, FIG. 24 illustrates that recommendation 2305 is no longer in the Recommendation area, but now a different recommendation 2401 has been output concerning this Use Case artifact.

Referring again to FIG. 26, if, in step 2611, the formalization routine determines that the user action is not an artifact rename action, the formalization routine continues to step 2614.

In step 2614, the formalization routine determines whether the user action is a save action. If, in step 2614, the formalization routine determines that the user action is a save action, then the formalization routine continues to step 2615.

In step 2615, the formalization routine saves the formalized artifacts and returns to step 2602.

If, however, in step 2614, the formalization routine determines that the user action is not a save action, then the formalization routine continues to step 2616. In step 2616, the formalization routine determines whether the user action is a quit action. If, in step 2616, the formalization routine determines that the user action is not a quit action, then the formalization routine returns to step 2602. Otherwise, the formalization routine continues to step 2617 where the formalization routine ends.

In an exemplary embodiment, the quit action may simply include entering the character 'Q' in any area of the user interface.

An exemplary embodiment may additionally allow for any number of actions commonly found in office applications such as those in the OpenOffice suite. These might correspond to saving the current state of the tool as in, for example, step 2615. The current state of the tool may be saved to, for example, a persistent storage, such as a file on a disk and the like. Additionally, actions may also allow for loading a state of the system from persistent storage.

A fourth exemplary embodiment of this invention serves as a tool for a user to structure information in the domain of scoring music.

Figure 25:
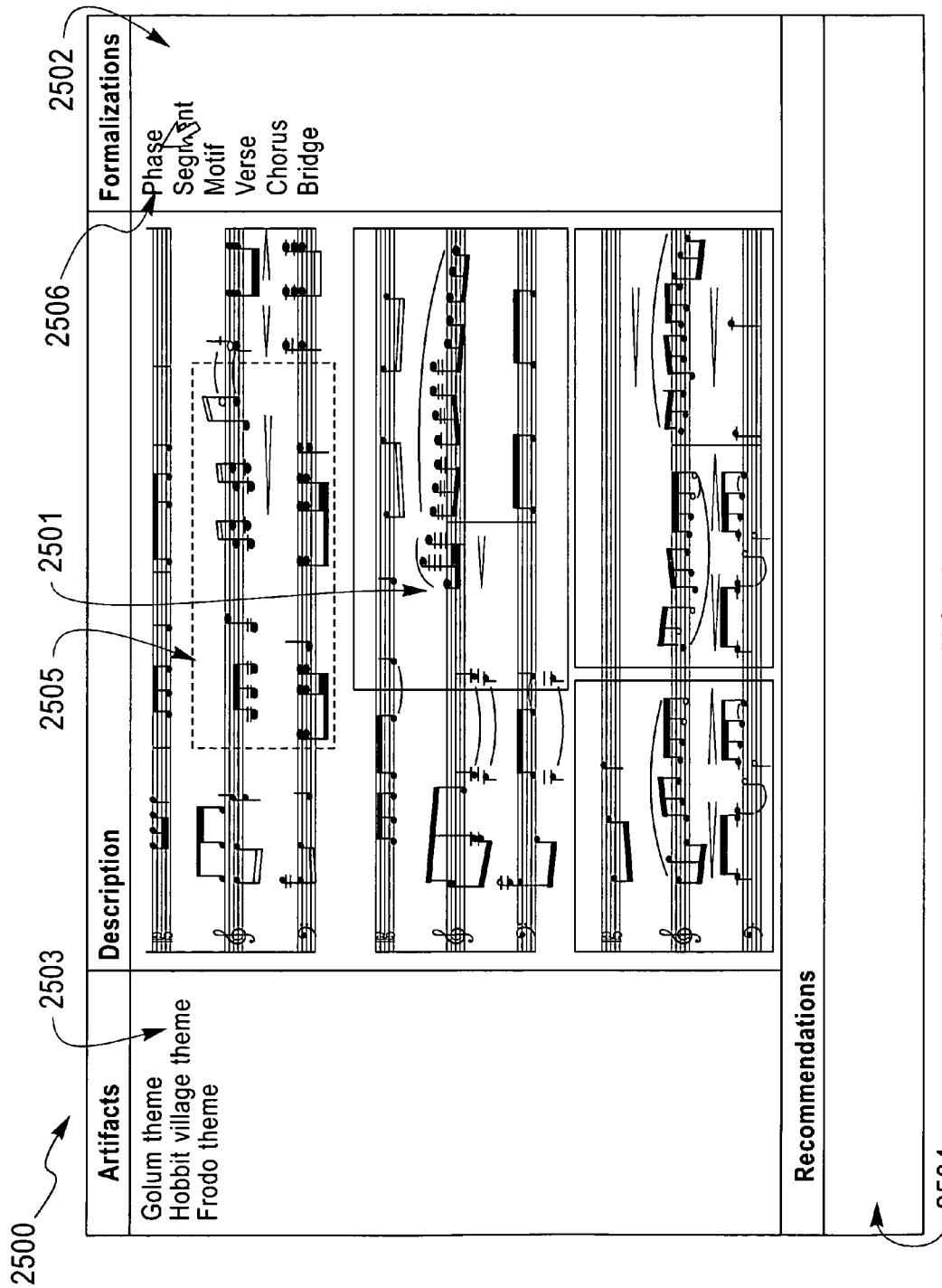
FIG. 25 illustrates another graphical user interface 2500 for structuring and formalizing information in the domain of music.

Referring to FIG. 25, an exemplary graphical user interface 2500, similar to the graphical user interface 1600 of FIGS. 16-24, includes a Description area 2501, into which a user may input an informal description including unstructured information and in which a user may identify a portion of an informal description, a Formalizations area 2502, in which the tool may list candidate formalizations and in which a user may identify a formalization, an Artifacts area 2503, in which the tool may list formal artifacts that may be generated according to an identified formalization based on an identified portion of the informal description, and a Recommendations area 2504, in which recommendations may appear.

In this exemplary embodiment, the candidate formalizations relate to artifacts from the domain of music, including: Phrase, Segment, Motif, Verse, Chorus, Bridge, and the like. These artifacts are concepts that may be familiar to one generally skilled in the art of scoring music.

FIG. 25 illustrates the graphical user interface 2500 after music has been input into the Description area 2501. In an exemplary embodiment, music notation may be input in the description area 2501 using a copy and paste function from applications such as those described in *The MIDI Manual* by David Miles Huber, Focal Press, January 1991.

Additionally, FIG. 25 illustrates the graphical user interface 2500 after a portion 2505 of the description been identified and as the user identifies the 'Phrase' formalization 2506.

Finally, FIG. 25 illustrates the graphical user interface 2500 after a number of portions (such as 2505, for example) of the informal description have been identified in the Description area 2501, a formalization from the Formalizations area 2502 has been identified for each identified portion, and a formal artifact has been generated accordingly for each identified portion, and the formal artifact has appears in the Artifacts area 2503 for each identified portion.

The set of formal artifacts 2503 include those labeled: 'Golum theme', 'Hobbit village theme', and 'Frodo theme'.

In all other respects, operation of the tool of the fourth exemplary embodiment is similar to that of the tool of the third exemplary embodiment.

While the invention has been described above as being advantageous for use in test case generation, travel planning, IT systems architecture, and music scoring, one of ordinary skill in the art appreciates that the present invention may also be advantageously applied to any application in which unstructured informal information may be structured and formalized. For example, exemplary embodiments of the present invention are useful for formalizing the sequence of events that led to a problem in a product, formalizing a procedure that should be followed in a business, describing and formalizing a medical procedure, formalizing a scientific experiment and the like without limitation.

While the above description presents information in computer programming and music domains, one of ordinary skill in the art understands that the present invention is applicable in any domain in which a classified vocabulary and formalization meta-model may be provided.

While the invention has been described in terms of several exemplary embodiments, those skilled in the art will recognize that the invention can be practiced with modification.

Further, it is noted that, Applicant's intent is to encompass equivalents of all claim elements, even if amended later during prosecution.

What is claimed is:

1. A method for generating a structured representation from an unstructured description, comprising:
   receiving, by a computer, an unstructured description inputted by a user; and
   generating, by said computer, a formalization model for the structured representation and a recommendation based upon said unstructured description, by continuously interacting with the user,
   wherein generating the formalization model and the recommendation comprises:
      receiving a portion of the unstructured description identified by the user; displaying a list of formalization for the user to select;
      receiving a formalization identification action-selected by the user based on the received portion of the unstructured description;
      recognizing a feature of said unstructured description;
      classifying said feature;
      executing a wizard that solicits information about said classified feature;
      generating a formal artifact according to the received user-selected formalization identification action, and based on the user-identified portion of the unstructured description;
      receiving a label inputted by the user for the generated formal artifact; and initiating a criteria analysis engine,
         wherein the criteria analysis engine determines if the generated formal artifact meets a criterion at which the criteria analysis engine is positioned, and
         wherein the criteria analysis engine outputs the recommendation concerning the generated formal artifact if the generated formal artifact meets the criterion at which the criteria analysis engine is positioned,
   wherein the recommendation indicates a way in which the generated formal artifact may be improved, and
   wherein the recommendation comprises a suggestion on how to proceed in a future generation of the formalization model, based on what was learned from said generated formal artifact.

2. The method of claim 1,
   wherein the recommendation indicates a way in which a current state of a representation of the generated formal artifact may be improved.

3. The method of claim 1, wherein said unstructured description comprises graphics.

4. The method of claim 1, further comprising receiving an identification of a portion of said unstructured description.

5. The method of claim 4, further comprising receiving an identification of a candidate classification for said identified portion of said unstructured description.

6. The method of claim 5, wherein said generating comprises generating a structured artifact based upon said identified candidate classification for said identified portion.

7. The method of claim 1, further comprising:
   receiving user input; and
   constructing structured artifacts based upon said user input.

8. The method of claim 1, wherein said formalization model comprises a software representation.

9. The method of claim 1, wherein said generating comprises referring to a meta-model.

10. The method of claim 1, wherein said formalization model comprises a software test sequence.

11. The method of claim 1, wherein said wizard converts said classified feature into an instance element based upon a meta-model.

12. The method of claim 1, further comprising:
   receiving at least one criterion concerning a structured artifact; and
   providing at least one structured artifact meeting said at least one criterion.

13. The method of claim 12, wherein said at least one criterion comprises a rule-based constraint describing whether the generated formal artifact meets a metamodel or a portion of the metamodel.

14. The method of claim 12, wherein said at least one criterion comprises at least one semantic rule.

15. The method of claim 12, further comprising providing at least one recommendation to a user based upon said structured artifact criteria.

16. The method of claim 1, wherein the recommendation comprises a guidance comprising an additional action to be performed after the formalization based on the generated formal artifact.

17. The method of claim 1, wherein said formalization identification action comprises at least one of a classification or a description of the unstructured description defined by the user.

18. The method of claim 1, wherein said formulization identification action comprises a model defined by the user based on the received portion of the unstructured description.

19. The method of claim 1, wherein the recommendation indicates an element that is missing from the generated formal artifact.

* * * * *